(12) United States Patent
Inomori et al.

(10) Patent No.: US 8,210,333 B2
(45) Date of Patent: Jul. 3, 2012

(54) CLUTCH AND VEHICLE HAVING CLUTCH

(75) Inventors: Toshinori Inomori, Shizuoka (JP); Yousuke Ishida, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 1049 days.

(21) Appl. No.: 12/142,716

(22) Filed: Jun. 19, 2008

(65) Prior Publication Data

US 2009/0000898 A1 Jan. 1, 2009

(30) Foreign Application Priority Data

Jun. 29, 2007 (JP) ................................. 2007-171778
Sep. 27, 2007 (JP) ................................. 2007-250601

(51) Int. Cl.
*F16D 43/12* (2006.01)
(52) U.S. Cl. ................... 192/105 B; 192/70.23; 192/83; 192/96; 192/85.5
(58) Field of Classification Search ............... 192/70.23, 192/83, 85.5, 96, 105 B
See application file for complete search history.

(56) References Cited

U.S. PATENT DOCUMENTS

| 4,645,049 | A  | * | 2/1987 | Matsuda et al. ................. 192/35 |
| 6,533,056 | B1 | * | 3/2003 | Maimone ....................... 180/230 |
| 7,014,026 | B2 | * | 3/2006 | Drussel et al. ............ 192/105 B |
| 2005/0133336 | A1 |   | 6/2005 | AbuSamra et al. |
| 2009/0000895 | A1 | * | 1/2009 | Inomori et al. ................. 192/31 |
| 2009/0038871 | A1 | * | 2/2009 | Inomori et al. ............... 180/219 |

FOREIGN PATENT DOCUMENTS

| EP | 1 772 642 A | 4/2007 |
| JP | 60 030832 A | 2/1985 |
| JP | 61 103019 A | 5/1986 |
| JP | 04-316724 | 11/1992 |
| JP | 2005-207515 | 8/2005 |
| WO | WO 2005 083284 A | 9/2005 |
| WO | WO 2005 124178 A | 12/2005 |

OTHER PUBLICATIONS

U.S. Appl. No. 12/142,740, filed Jun. 19, 2008, entitled: "Centrifugal Clutch and Vehicle Provided with the Same," inventors: Toshinori Inomori et al., assgnee: Yamaha Hatsudoki Kabushiki Kaisha.
European Search Report dated Apr. 22, 2009 for European Patent Application No. EP 08 01 1740.
European Search Report dated Apr. 28, 2009 for European Patent Application No. EP 08 01 1742.

* cited by examiner

*Primary Examiner* — David D Le
*Assistant Examiner* — Terry Chau
(74) *Attorney, Agent, or Firm* — Dickstein Shapiro LLP

(57) ABSTRACT

A clutch structure, constructed without a one-way clutch, remains engaged until the input side rotational speed becomes relatively low. A pressure plate presses a group of plates directly or indirectly by moving in the direction of an axis, bringing the group of plates into a press contact state. An input side press body turns around the axis with the rotation of a clutch housing, presses the pressure plate to the side of the group of plates by centrifugal force generated during the turning, and moves in a direction away from the axis. A roller retainer presses the group of plates directly or indirectly by moving in the direction of the axis, bringing the group of plates into a press contact state. An output side press body turns around the axis with the rotation of an output side clutch member, presses the roller retainer to the side of the group of plates by centrifugal force generated during the turning, and moves in a direction away from the axis.

18 Claims, 17 Drawing Sheets

US 8,210,333 B2

CLUTCH AND VEHICLE HAVING CLUTCH

PRIORITY INFORMATION

This patent application is based on and claims priority under 35 U.S.C. §119 to Japanese Patent Application No. 2007-171778, filed on Jun. 29, 2007 and Japanese Patent Application No. 2007-250601, filed on Sep. 27, 2007, the entire contents of which are hereby expressly incorporated by reference.

TECHNICAL FIELD

The present invention relates to a clutch and a vehicle having a clutch.

BACKGROUND ART

Depending on the type of vehicle, an engine brake may be required to operate in as low an engine speed range as possible. For example, the use of a one-way clutch, as disclosed in Japanese Patent Publication 2005-207515 of Aug. 4, 2005 ("Patent Document 1"), is one method that would allow an engine brake to operate in as low an engine speed range as possible.

Specifically, as disclosed in Patent Document 1, when an outer clutch member rotates faster than an inner clutch member, a one-way clutch, which connects the outer clutch member and the inner clutch member, may be provided in order to transmit a back torque to the crankshaft. According to this setup, as described in Patent Document 1, even after the rotational speed of the crankshaft is decreased and a centrifugal clutch is disengaged, the engine brake works effectively owing to the back torque transmitted to the crank shaft by the one-way clutch.

The present invention has been devised in light of the above-described circumstances, and it is an object thereof to provide a clutch structure which is constructed without a one-way clutch, and which is not disengaged until the input side rotational speed becomes relatively low in order to comply with the requirement that the engine brake works in as low an engine speed range as possible.

SUMMARY

A clutch according to one embodiment of the present invention includes an input side clutch member rotating around an axis line, an output side clutch member rotating around the axis line, a group of plates, an input side pressure member, an input side retainer, an input side press body, an output side pressure member, an output side retainer, and an output side press body. The group of plates includes an input side clutch disc and an output side clutch disc. The input side clutch disc rotates with the input side clutch member. The output side clutch disc faces the input side clutch disc and is displaceable in the axial direction. The output side clutch disc rotates with the output side clutch member.

The input side pressure member rotates with the input side clutch member. The input side pressure member is displaceable in the direction of the axis line. The input side pressure member, by moving to the side of the group of plates in the direction of the axis line, presses the group of plates directly or indirectly, bringing the group of plates into a press contact state. The input side retainer faces the surface of the input side pressure member that is opposite the group of plates. The input side retainer together with the input side pressure member form a space the width of which narrows as the distance from the axis line increases.

The input side retainer is displaceable in the direction of the axis line relative to the input side clutch member while being rotated with the input side clutch member. The input side retainer is also biased to the side toward the group of plates by a first biasing member. The input side press body is disposed in the space between the input side pressure member and the input side retainer. The input side press body turns around the axis line with the rotation of the input side clutch member, and moves in a direction away from the axis line while pressing the input side pressure member to the side of the group of the plates by the centrifugal force generated during a turning.

The output side pressure member rotates with the output side clutch member. The output side pressure member is displaceable in the direction of the axis line. The output side pressure member, by moving to the side of the group of plates in the direction of the axis line, presses the group of plates directly or indirectly, bringing the group of plates into a press contact state. The output side retainer faces the surface of the output side pressure member that is opposite the group of plates. The output side retainer together with the output side pressure member form a space the width of which narrows as the distance from the axis line increases. The output side retainer is displaceable in the direction of the axis line relative to the output side clutch member and the group of plates. The output side retainer is also biased toward the side of the group of plates.

The output side press body is disposed in the space between the output side pressure member and the output side retainer. The output side press body revolves around the axis line in consonance with the rotation of the output side clutch member, and moves in a direction away from the axis line while pressing the output side pressure member to the side of the group of the plates by the centrifugal force generated during the turning.

Another aspect of the present invention concerns vehicles which include a clutch constructed according to the present invention.

DETAILED DESCRIPTION

According to the present invention, a clutch that is not disengaged until the input side rotational speed becomes relatively low may be constructed without the use of a one-way clutch structure.

A clutch and a vehicle having the clutch according to an embodiment of the present invention will be described herein below with reference to a clutch 2 shown in FIG. 1 and a motorcycle 1 shown in FIG. 3. However, the motorcycle 1 and the clutch 2 are just examples of preferred embodiments according to the present invention. The present invention is not limited to the motorcycle 1 and the clutch 2. A vehicle according to the present invention may be a straddle-type vehicle, for example, an off-road motorcycle, a scooter or a moped, or an ATV (All Terrain Vehicle), or the like. Also, a vehicle according to the present invention may be a vehicle other than a straddle-type vehicle, such as a four-wheel vehicle. Thus, the term "motorcycle," as used in the present specification, does not refer only to a motorcycle in the narrow sense, but rather is intended to broadly include off-road vehicles, scooters and mopeds, and the like.

Figure 2:
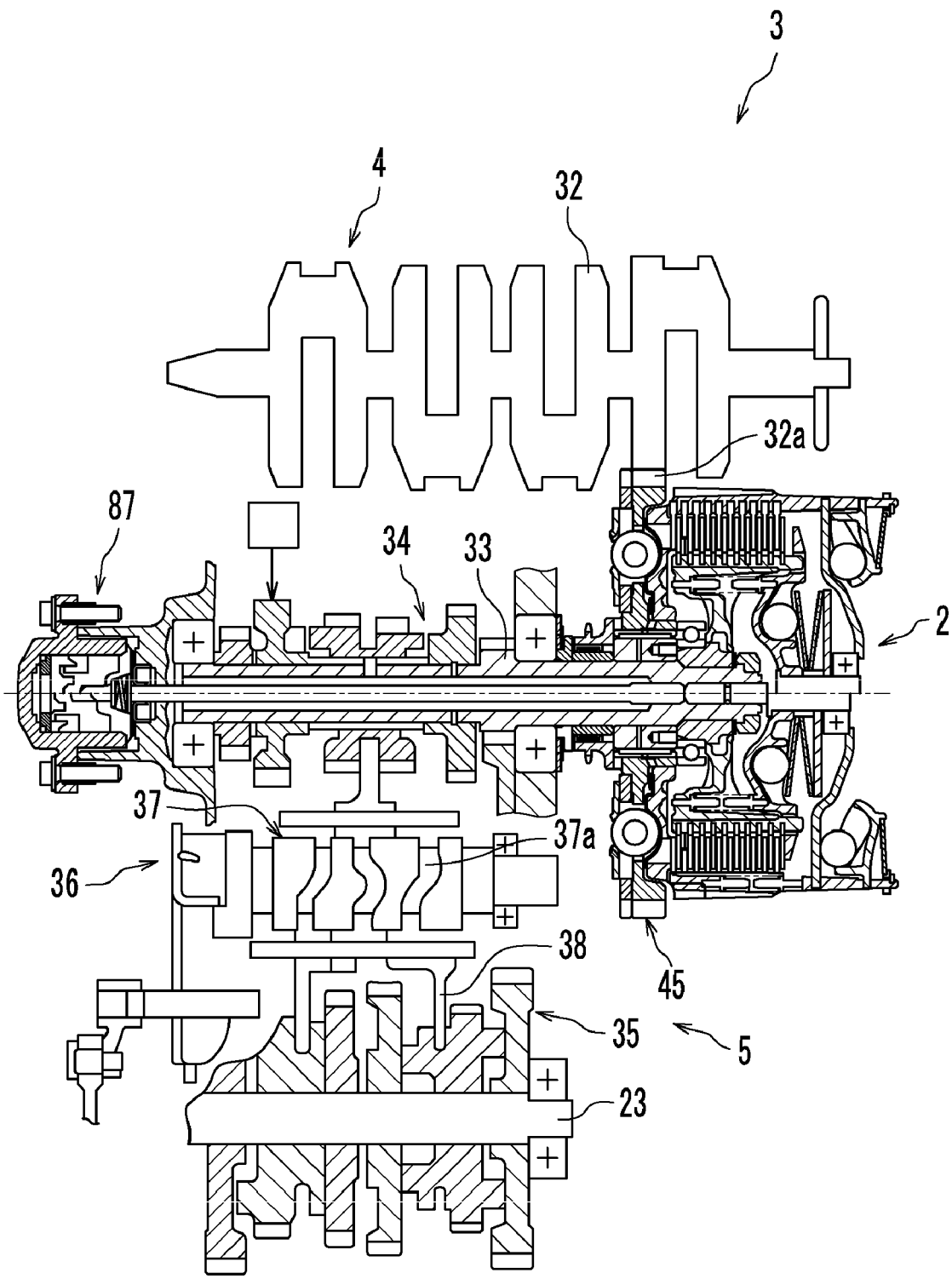
FIG. 2 is a schematic view illustrating a power unit using the clutch of FIG. 1.
Figure 3:
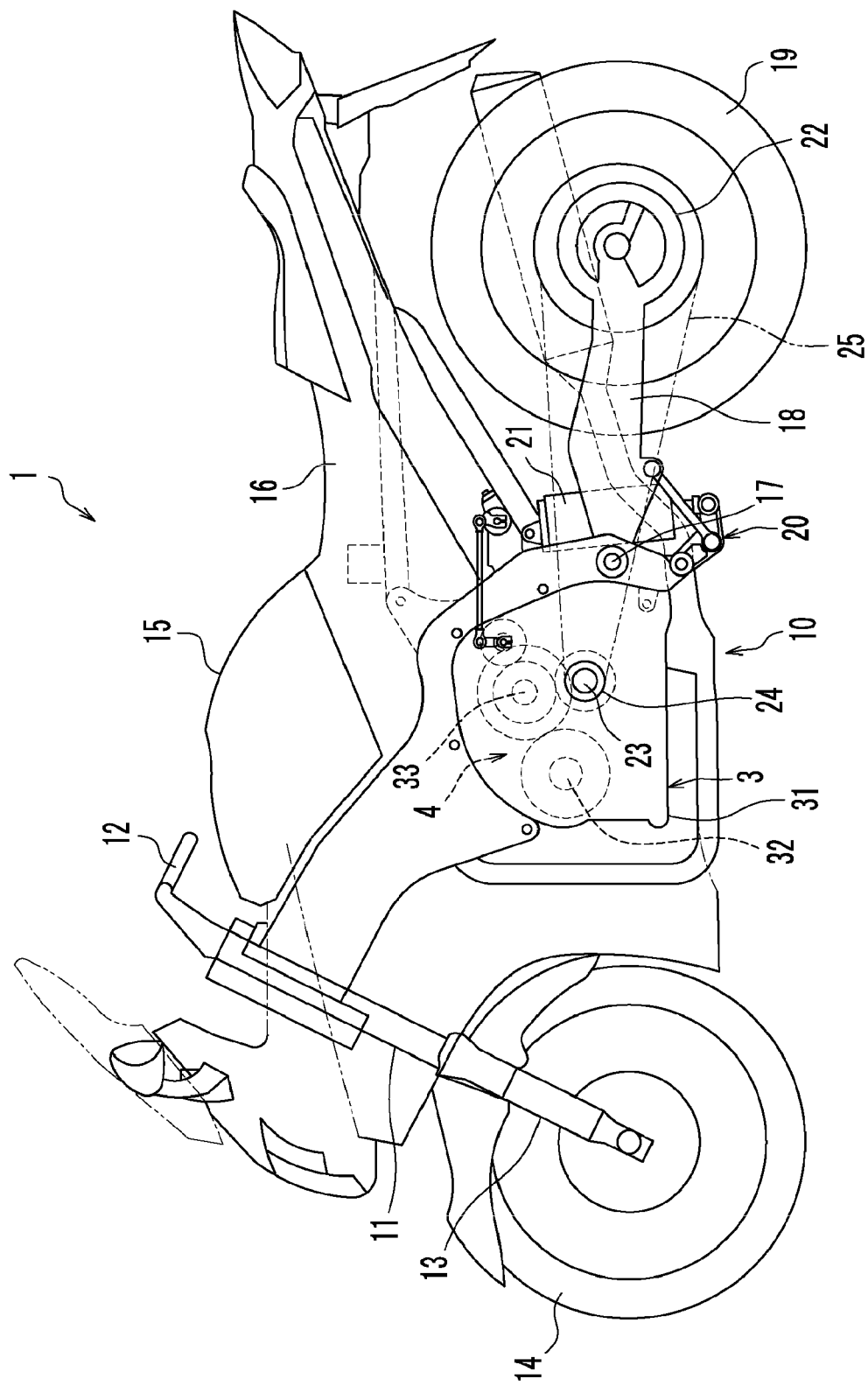
FIG. 3 is a left side view of a motorcycle using the power unit of FIG. 2.

It is to be noted that, in the following description, the terms "forward," "backward," "right," and "left" refer to directions which are generally defined from the perspective of a rider sitting on a seat 16 of motorcycle 1, as shown in FIG. 3. Also, as shown in FIG. 1, the upper half portion relative to axis line AX and the lower half portion relative to axis line AX illustrate the clutch 2 in different states. Specifically, the upper half portion relative to the axis line AX illustrates the state that a group of plates 66 is not in a press contact state and the lower half portion relative to the axis line AX illustrates the state that the group of plates 66 is in a press contact state. For convenience of describing, only a portion of a power unit 3 is illustrated in FIG. 2.

Figure 1:
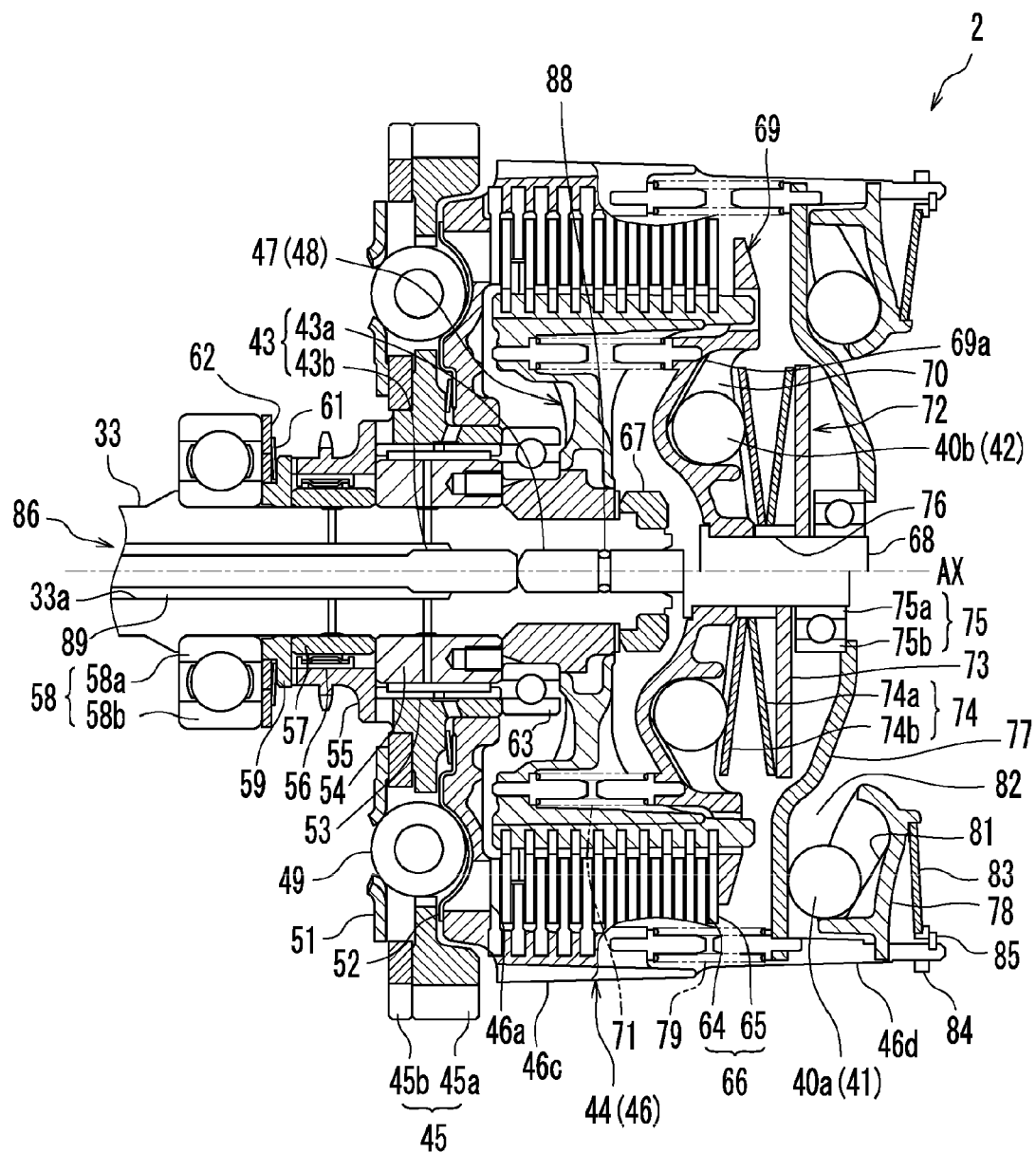
FIG. 1 is a cross-sectional view of a clutch according to the present invention.

FIG. 1 is a cross-sectional view of a clutch 2 according to an embodiment of the present invention. FIG. 2 is a schematic view illustrating the power unit 3 using the clutch 2. FIG. 3 is a left side view of the motorcycle 1 having the power unit 3. At first, referring primarily to FIG. 3, an outline configuration of the motorcycle 1 is described.

Outline Configuration of Motorcycle 1

As shown in FIG. 3, the motorcycle 1 includes a vehicle body frame 10. The vehicle body frame 10 includes a head pipe 11. A handle 12 is attached at the upper end of head pipe 11. At the lower end of head pipe 11, a front wheel 14 is attached rotatably through a front fork 13.

A fuel tank 15 is attached to the vehicle body frame 10. The seat 16 is disposed in an approximately central portion in the forward and backward direction of the vehicle body.

The power unit 3 is suspended on to the vehicle body frame 10. A pivot shaft 17 is provided on the latter half of the vehicle body frame 10. A rear arm 18 is swingably supported to the pivot shaft 17. Also, the rear arm 18 is supported through a linkage 20 and a rear cushion unit 21 by the vehicle body frame 10.

A rear wheel 19 is rotatably attached to a rear end portion of the rear arm 18. A driven sprocket 22 is provided on the rear wheel 19. On the other hand, a drive sprocket 24 is provided on a drive shaft 23 of the power unit 3. A chain 25, being used as a drive force transmission mechanism, is wound around the drive sprocket 24 and the driven sprocket 22. Power generated by the power unit 3 is transmitted to rear wheel 19 via chain 25 causing rotation of rear wheel 19.

In accordance with the present invention, the driving force transmission mechanism that transmits the power from the power unit 3 to the rear wheel 19 is not limited to the chain 25. The driving force transmission mechanism may be implemented, for example, by a drive shaft or a belt, or the like.

Power Unit 3

Referring primarily to FIG. 2, the configuration of the power unit 3 will be described in detail. As shown in FIG. 2, the power unit 3 includes an engine 4, a transmission or shifting mechanism 5 and the clutch 2. In the present invention, the type of engine is not limited in particular. In the present embodiment, the engine 4 is described in an exemplary manner as being a water cooled, 4-cycle, parallel, 4-cylinder type engine.

Engine 4

The engine 4 is disposed with a cylinder axis thereof (not shown) extending rather obliquely and upwardly toward the forward part of the vehicle body. The engine 4 includes a crankcase 31 and a crankshaft 32 as shown in FIG. 3. The crankshaft 32 is housed in the crankcase 31. The crankshaft 32 is disposed so as to extend in the vehicle-width direction.

Shifting Mechanism 5

As shown in FIG. 2, the crankshaft 32 is connected to the shifting mechanism 5 through the clutch 2. The shifting mechanism 5 includes a main shaft 33, drive shaft 23 and a gear selection mechanism 36. The main shaft 33 is connected to the crankshaft 32 through the clutch 2. The main shaft 33 and the drive shaft 23 each are disposed approximately in parallel to the crankshaft 32.

A multi-stage shift gear 34 is mounted on the main shaft 33. On the other hand, a plurality of shift gears 35 corresponding to the multi-stage shift gear 34 is mounted on the drive shaft 23. Only the selected pair of gears of the plurality of shift gears 34 and the plurality of shift gears 35 are engaged to each other. At least one of shift gears 34, except for the selected shift gear 34 among the plurality of shift gears 34, or the shift gears 35, except for the selected shift gear 35 among the plurality of shift gears 35, is rotatable with respect to the main shaft 33 or the drive shaft 23, respectively. In other words, at least either of shift gears 34 (which is not selected) or the shift gears 35 (which is not selected) idle with respect to the main shaft 33 or the drive shaft 23. That is, the rotation transmission between the main shaft 33 and the drive shaft 23 is only carried out through the selected shift gear 34 and the selected shift gear 35 which are engaged to each other.

Selection of shift gears 34 and 35 is done with the gear selection mechanism 36. Specifically, selection of shift gears 34 and 35 is done with a shift cam 37 of the gear selection mechanism 36. A plurality of cam grooves 37a are formed in the outer surface of shift cam 37. A shift fork 38 is mounted to each cam groove 37a. Each shift fork 38 is engaged to the prescribed shift gear 34 on the main shaft 33 and the prescribed shift gear 35 on the drive shaft 23, respectively. Rotation of the shift cam 37 guides each of the plurality of shift forks 38 in each cam groove 37a and moves each of the shift forks in the axial direction of the main shaft 33. Thus, gears engaged to each other among shift gears 34 and 35 are selected. Specifically, among the plurality of shift gears 34 and 35, only a pair of gears at a position corresponding to the rotational angle of the shift cam 37 become locked to the main shaft 33 and the drive shaft 23, respectively, with the spline mechanism. Thus, the position of gear shifting is determined and transmitting of rotation, through shifting gears 34 and 35, is done at a predetermined transmission ratio between the main shaft 33 and the drive shaft 23. As a result, engine power is transmitted to the rear wheel 19 through the chain 25 shown in FIG. 3, and the rear wheel 19 is rotated.

The gear selection mechanism 36 is operated by a shift pedal (not shown).

Clutch 2

Next, referring primarily to FIG. 1, the configuration of clutch 2 will be described in detail. The clutch 2 of the present embodiment is a wet-type multi-plate friction clutch. The clutch 2 is a centrifugal clutch that can be also operated by a rider.

Input Side Clutch Member 44 (=Clutch Housing 46)

The clutch 2 includes an input side clutch member 44. The input side clutch member 44 rotates around the axis line AX of the main shaft 33. In this embodiment, the input side clutch member 44 is constituted by a clutch housing 46. The clutch housing 46 is penetrated by the main shaft 33. The clutch housing 46 has the same axis line AX as the main shaft 33.

Figure 4:
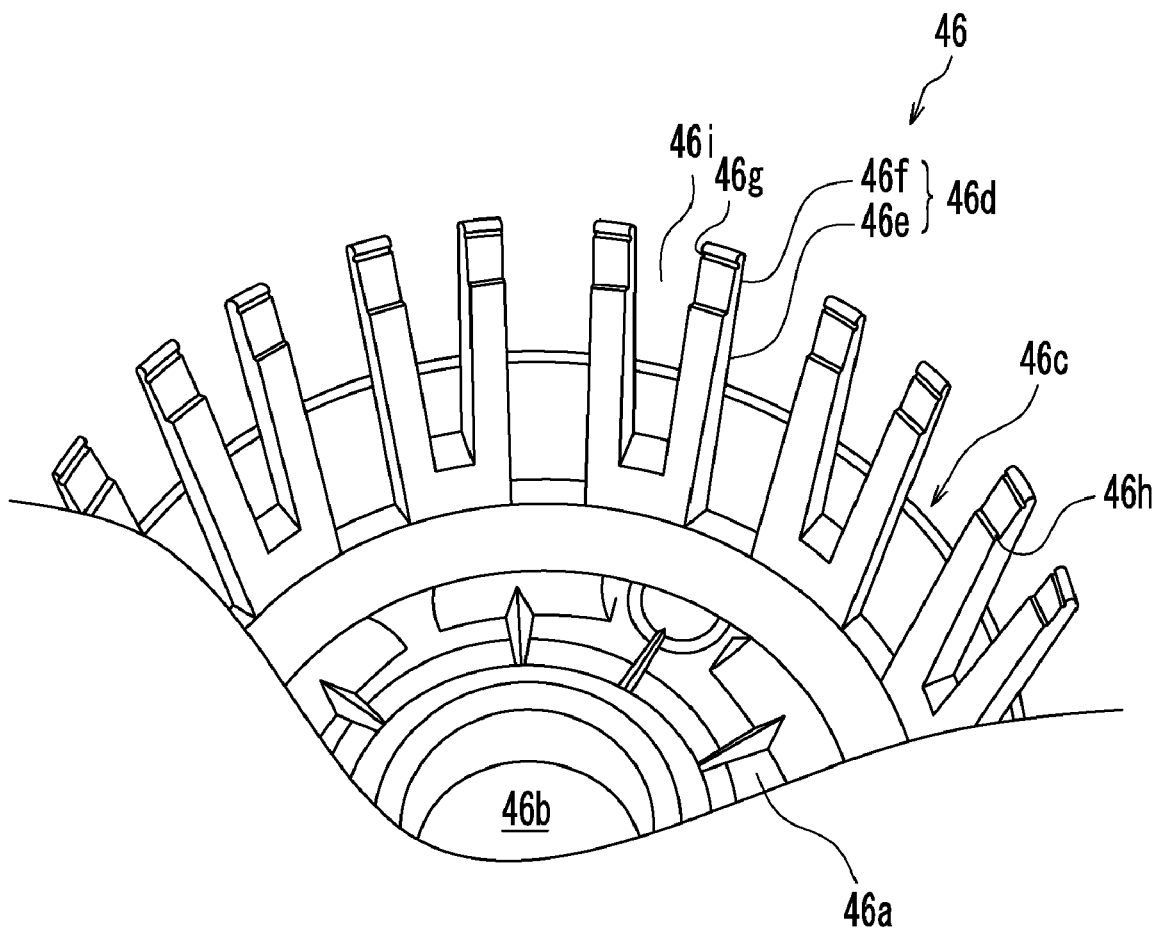
FIG. 4 is a partial perspective view of a clutch housing viewed obliquely from the top.

FIG. 4 is a perspective view of clutch housing 46 when viewed obliquely from the upper side. As shown in FIG. 4, the clutch housing 46 includes the housing body 46*c*. The housing body 46*c*, which is formed generally into a cylindrical shape, has one end closed by a bottom portion 46*a*. An insertion hole 46*b*, into which the main shaft 33 is inserted, is formed in the bottom portion 46*a*. Multiple pairs of arms 46*d* are provided in the housing body 46*c*. Each of the arms 46*d* is formed so as to project radially inwardly from the inner peripheral surface of the housing body 46*c*. Each of the arms 46*d* extends outwardly from the bottom portion 46*a* in the vehicle-width direction. Each of the arms 46*d* includes an inner slide portion 46*e* which is located relatively inwardly in the vehicle-width direction, and an outer portion 46*f* which is located relatively outwardly in the vehicle-width direction. The thickness of the inner portion 46*e* in the radial direction is thicker than that of the outer portion 46*f*. Because of this, an end face 46*h* is formed at the border between the inner portion 46*e* and the outer portion 46*f*. Also, in the tip portion of the outer portion 46*f* of each arm 46*d*, a linear groove 46*g* extending in the circumferential direction is formed.

As shown in FIG. 1, a scissors gear 45 is attached to the clutch housing 46. Specifically, the clutch housing 46 is fixed non-rotatably to the gear 45*a* which will be described below. The axis line of the scissors gear 45 is common with that of the clutch housing 46. As shown in FIG. 2, the scissors gear 45 engages with a gear 32*a* of the crankshaft 32. Consequently, scissors gear 45 and clutch housing 46 are rotated integrally with rotation of crankshaft 32.

Specifically, as shown in FIG. 1, the scissors gear 45 includes two gears 45*a* and 45*b*, a spring 49 and two plates 51 and 52. The gear 45*a* and the gear 45*b* are located between the two plates 51 and 52. The two plates 51 and 52 are fixed to each other in the axial direction of the main shaft 33 by fastening means such as a rivet or a screw or the like. Hereby, the two gears 45*a* and 45*b* are fixed substantially to each other in axial direction of the main shaft 33. On the other hand, the gear 45*a* and the gear 45*b* are mutually rotatable relative to the direction of rotation.

The number of teeth on the gear 45*a* and the gear 45*b* are mutually equal. The gear 45*a* and the gear 45*b* are disposed so that the teeth of the gear 45*a* and the teeth of the gear 45*b* are located alternately in a circumferential direction. The spring 49 is provided between the gear 45*a* and the gear 45*b*. As a result, torsional force is applied to the gear 45*a* and the gear 45*b* by the spring 49 so that the fluctuation torque of engine 4 is absorbed.

Between the scissors gear 45 and the main shaft 33, a needle bearing 53 and a spacer 54, which are non-rotatably fixed to the main shaft 33, are disposed. By the needle bearing 53, the scissors gear 45 is rotatable to the main shaft 33. In other words, the rotation of the scissors gear 45 is arranged not to be directly transmitted to the main shaft 33.

A sprocket 55 is in contact with an inner terminal side of scissors gear 45 in the vehicle-width direction. Sprocket 55 is utilized for driving a device such as an oil pump (not shown). The main shaft 33 is inserted into the sprocket 55. The sprocket 55 has the same axis line AX as the main shaft 33. A bearing 56 and a collar 57 are disposed between the sprocket 55 and the main shaft 33. The collar 57 is fixed non-rotatably to the main shaft 33. The bearing 56 is disposed between the collar 57 and the sprocket 55. Thus, sprocket 55 is rotatable relative to the main shaft 33. Therefore, the sprocket 55 rotates with the scissors gear 45 independently from the main shaft 33. As a result, the oil pump or the like connected to the sprocket 55 is driven by the means for transferring power, such as a belt and a chain.

A spacer 59 and a bearing 58 are disposed farther inwardly than the collar 57 in a vehicle-width direction. While the spacer 59 is in contact with the collar 57, it is not in contact with the sprocket 55. While the spacer 59 is in contact with an inner ring 58*a* of the bearing 58, it is not in contact with an outer ring 58*b* of the bearing 58.

Figure 7:
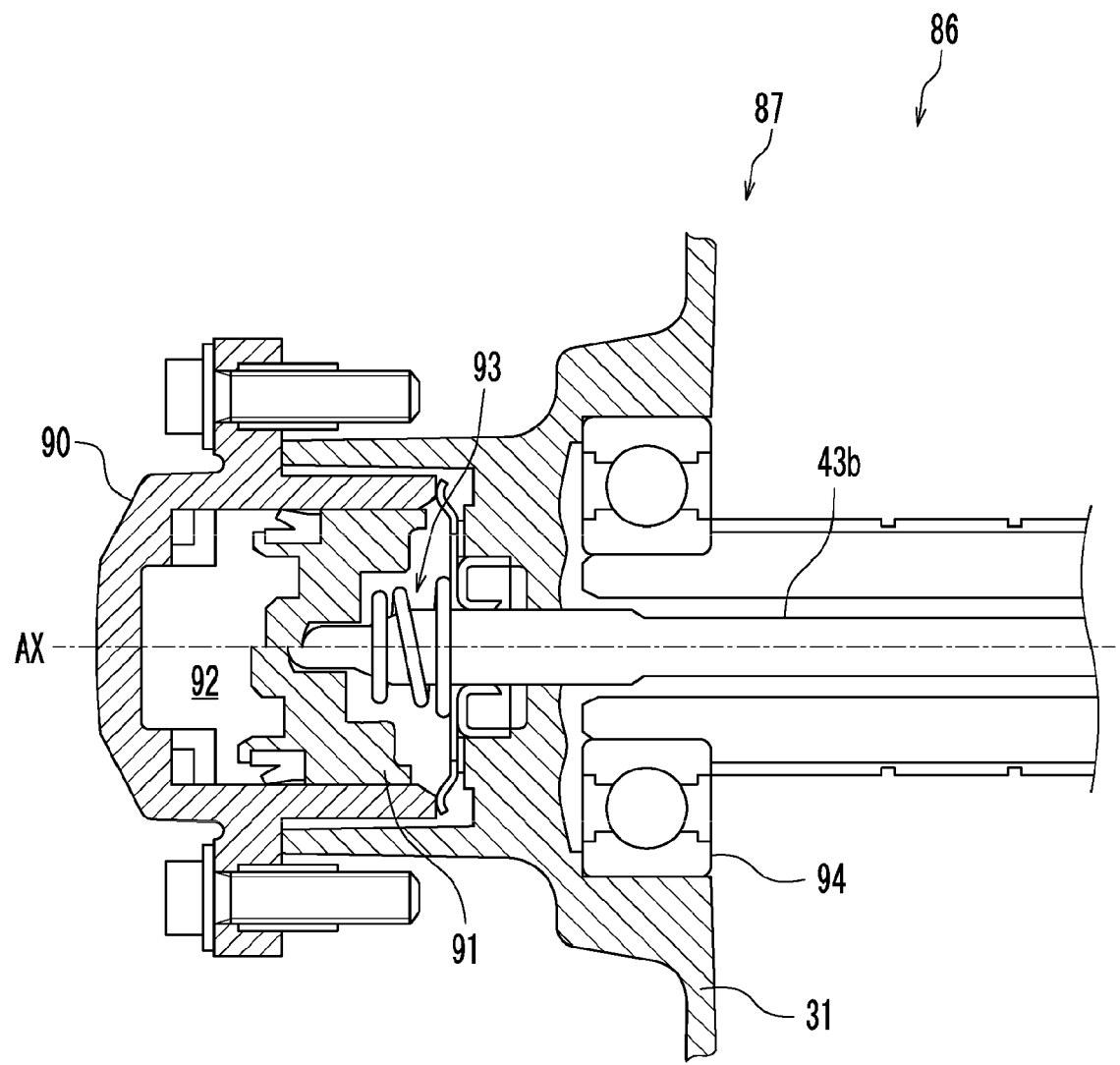
FIG. 7 is a cross-sectional view of a push rod driving mechanism.

The outer ring 58*b* of the bearing 58 is fixed to the crankcase 31. In other words, the right side edge of the main shaft 33 is rotatably supported relative to the crankcase 31 by the bearing 58. On the other hand, as shown in FIG. 7, the left side edge of the main shaft 33 is rotatably supported to the crankcase 31 by a bearing 94.

The bearing 58 is non-displaceably mounted to the main shaft 33 in the axial direction of axis line AX of the main shaft 33. On the other hand, a thrust bearing 63 is disposed between a clutch boss 48 and the scissors gear 45. The scissors gear 45, the needle bearing 53, the spacer 54, the sprocket 55, the bearing 56, the collar 57 and the spacer 59 are fixed by the bearing 58 and the thrust bearing 63 in the direction of axis line AX of the main shaft 33.

A Belleville spring 61 and a washer 62 are disposed between the spacer 59 and the bearing 58. The washer 62 is in contact with only the outer ring 58*b* in the bearing 58. The washer 62 is biased by the Belleville spring 61 inwardly in the direction of the axis line AX of the main shaft 33. In other words, the washer 62 is biased by the Belleville spring 61 toward the side of the outer ring 58*b* of the bearing 58. Thus, when the main shaft 33 rotates, sliding resistance is generated at least either between the Belleville spring 61 and the washer 62 or between the washer 62 and the outer ring 58*b*. This sliding resistance results in, for example, the resistance against rotation of the main shaft 33 when the clutch 2 is disengaged. Because of this, for example, when the clutch 2 is disengaged, the rotation of main shaft 33 is settled relatively early.

Group of Plates 66

A plurality of friction plates 64, serving as input side clutch discs, are disposed within clutch housing 46, as schematically illustrated in reference to FIG. 1. Each of the friction plates 64 is fixed to the clutch housing 46 in relation to the rotational direction of the main shaft 33. Consequently, the plurality of friction plates 64 rotate with the clutch housing 46. Each of the friction plates 64 is displaceable in the direction of axis line AX of the main shaft 33. Because of this, the distance between the mutually adjacent friction plates 64 is variable.

The plurality of friction plates 64 is arranged in the direction of axis line AX of the main shaft 33. Clutch plates 65, which serve as output side clutch plates, are arranged between the mutually adjacent friction plates 64. The clutch plate 65 faces the adjacent friction plate 64. Each of the clutch plates 65 is fixed to the clutch boss 48 in the direction of axis line AX of the main shaft 33. As a result, clutch plates 65 rotate with the clutch boss 48. Each of the clutch plates 65 is displaceable in the direction of axis line AX of the main shaft 33. Because of this, the distance between clutch plates 65, which are adjacent to each other, is variable.

In this embodiment, the group of plates 66 is constituted by the plurality of the friction plates 64 and the plurality of clutch plates 65.

For a smooth change in load when the clutch 2 is engaged, a judder spring may be attached to the group of plates 66. Specifically, for example, the judder spring may be disposed between the clutch plate 65 and the friction plate 64 to bias the clutch plate 65 and the friction plate 64 away from each other.
Output Side Clutch Member 47 (=Clutch Boss 48)

In this embodiment, the clutch boss 48 serves as the output side clutch member 47. The clutch boss 48 is non-rotatably fixed to the main shaft 33 by a nut 67. In other words, the clutch boss 48 rotates around the axis line AX with the main shaft 33.
Roller Retainer 69

A shaft 68 is disposed outwardly relative to the main shaft 33 in a vehicle-width direction. The shaft 68 is press-fitted between the main shaft 33 and a pressure plate 77. The shaft 68 rotates with the main shaft 33. The shaft 68 is displaceable in the direction of axis line AX of the main shaft 33. A roller retainer 69 is mounted on the shaft 68 as an output side pressure member. The roller retainer 69 is non-rotatable relative to the shaft 68. In other words, the roller retainer 69 rotates with the shaft 68. On the other hand, in the axial direction of the shaft 68, the roller retainer 69 can be displaced with respect to the shaft 68.

The roller retainer 69 extends from the shaft 68 outwardly in the radial direction. The outside edge of the roller retainer 69 in the radial direction faces the group of plates 66 in the direction of axis line AX of the main shaft 33. When the roller retainer 69 is displaced, with the shaft 68, inwardly in a vehicle-width direction, the distance between the roller retainer 69 and the bottom portion 46a of the clutch housing 46 is shortened. Thus, the group of plates 66 is pressed by the roller retainer 69 directly. As a result, the group of plates 66 is brought into a press contact state. Specifically, the friction plates 64 and the clutch plates 65 are pressed to be in contact with each other. Hereby, a frictional force, in relation to the rotational direction, is generated between the friction plate 64 and the clutch plate 65. As a result, the clutch boss 48 rotates with the clutch housing 46.

On the other hand, when the roller retainer 69 is displaced with the shaft 68 outwardly in the vehicle-width direction, the distance between the roller retainer 69 and the bottom portion 46a of the clutch housing 46 is lengthened. Consequently, the pressed-contact state of the group of plates 66 is released. Thus, the frictional force, in relation to the rotational direction, between the friction plate 64 and the clutch plate 65 becomes relatively small. As a result, the rotation of the clutch housing 46 is not transmitted to the clutch boss 48.

Thus, in this embodiment, the roller retainer 69 is displaced inwardly and outwardly in the vehicle-width direction, and thereby the intermittence of clutch 2 may be carried out.

A plurality of output side "off" springs 71, which serve as output side biasing members, are disposed at an equal interval along a circumferential direction between the clutch boss 48 and the roller retainer 69. The roller retainer 69 is biased by the plurality of output side "off" springs 71 in a direction away from the group of plates 66. Hereby, in the state that a biasing force acting inwardly in the vehicle-width direction is not applied to the roller retainer 69, the roller retainer 69 is disposed in a state where it is relatively separated from the bottom portion 46a of the clutch housing 46. Therefore, the group of plates 66 is in a non-pressed contact state. For example, the output side "off" springs 71 may be constituted by compression coil springs.

The stronger the elastic force of the output side "off" spring 71, the harder the clutch 2 is to be engaged and the easier the clutch 2 is to be disengaged. On the other hand, the weaker the elastic force of the output side "off" spring 71, the easier the clutch 2 is to be engaged and the harder the clutch 2 is to be disengaged. Therefore, the timing of the intermittence of the clutch 2 can be controlled by adjusting the elastic force of the output side "off" spring 71.

A plurality of cam surfaces 69a is formed on the opposite surface of the roller retainer 69 relative to the group of plates 66. The plurality of cam surfaces 69a is located inwardly relative to the group of plates 66 in a radial direction. The plurality of cam surfaces 69a is disposed radially around the axis line AX of the main shaft 33. Each of the cam surfaces 69a extends outwardly in the vehicle-width direction as it goes outwardly in the radial direction.
Output Side Retainer 72

An output side retainer 72 is attached to the shaft 68. The output side retainer 72 is attached to the shaft 68 non-rotatably and non-displaceably in the direction of axis line AX. The output side retainer 72 faces the opposite surface of the roller retainer 69 relative to the group of plates 66. In other words, the output side retainer 72 faces the cam surface 69a. The output side retainer 72 and each cam surface 69a of the roller retainer 69 form a space 70 the width of which narrows with increased distance from the axis line AX.

Specifically, the output side retainer 72 is provided with a spring stopper plate 73 and a spring 74. The spring stopper plate 73 is fixed to the shaft 68.

The spring 74 in the present embodiment is implemented by two Belleville springs 74a and 74b in the general shape of orbicular zones. The Belleville spring 74a extends outwardly in the vehicle-width direction and outwardly in the radial direction. The outer end of Belleville spring 74a in the radial direction is blocked by spring stopper plate 73. The inner end of the Belleville spring 74b is in contact with the inner end of the Belleville spring 74a. The Belleville spring 74b extends inwardly in the vehicle-width direction and outwardly in the radial direction. The above space 70 is formed by the Belleville spring 74b and the cam surface 69a. A collar washer 76 is disposed between the spring 74 and the shaft 68. Direct contact between the shaft 68 and the spring 74 is suppressed by the collar washer 76.
Output Side Roller Weight 42

An output side press body 40b is disposed in the space 70. The output side press body 40b is constituted by a plurality of output side roller weights 42. The output side roller weights 42 revolve with the rotation of the shaft 68. As a result, the roller retainer 69 is pressed to the side of the group of plates 66 by the centrifugal force generated due to turning of the shaft 68 and the movement of the output side roller weights 42 away from the axis line AX while pressing spring 74 outwardly in the vehicle-width direction. Thus, the roller retainer 69 moves to the side of the group of plates 66, and the group of plates 66 is brought into a pressed-contact state.

The shape of the output side roller weight 42 is not particularly limited as long as the shape is suitable for turning with the rotation of the shaft 68 and being displaceable inwardly and outwardly in the radial direction. Specifically in this embodiment, the output side roller weight 42 is formed in an approximately cylindrical shape.

More specifically, each of the output side roller weights 42, in relation to the axis line direction thereof, is divided into a central portion and two lateral portions. The two lateral portions are non-rotatable relative to each other. On the other hand, the central portion is rotatable relative to both lateral portions. The cam surface 69a is formed to be in contact with only the central portion. In other words, only the central portion that is in contact with the cam surface 69a can rotate with respect to the other portions. Thus, sliding friction between the cam surface 69a and the output side roller weight 42 can be reduced. As a result, abrasion of the output side roller weight 42 can be suppressed.

Pressure Plate 77 and Roller Retainer 78

The pressure plate 77, which serves as the input side pressure member, is attached non-rotatably to an outer ring 75b of a bearing 75. The outer circumference of the pressure plate 77 in the radial direction is engaged with a plurality of arms 46d shown in FIG. 4. Consequently, the pressure plate 77 becomes non-rotatable with respect to clutch housing 46. In other words, the pressure plate 77 rotates with the clutch housing 46. On the other hand, in the direction of axis AX, the pressure plate 77 is displaceable with respect to the clutch housing 46.

Between the pressure plate 77 and the clutch housing 46, a plurality of input side "off" springs 79, which serve as input side biasing members, are disposed at equally-spaced intervals along the circumferential direction of the clutch housing 46. Specifically, an input side "off" springs 79 is disposed in each slit 46i of a pair of arms 46d, as shown in FIG. 4. The input side "off" springs 79 comprise a compression coil spring in the present embodiment. The pressure plate 77 is biased outwardly in the vehicle-width direction by input side "off" spring 79. In other words, the pressure plate 77 is biased in the direction of being separated from the group of plates 66 by the input side "off" spring 79.

Thus, in the present embodiment, the pressure plate 77, which serves as the input side pressure member, indirectly presses the roller retainer 69, which serves as the output side pressure member, through the bearing 75 and the shaft 68. Hereby, the pressure plate 77 presses the group of plates 66 indirectly.

The roller retainer 69, the output side retainer 72 and the output side press body 40b are disposed on one side of the group of plates 66. The pressure plate 77, a roller retainer 78 and an input side press body 40a are disposed on the same side further away from the group of plates than the roller retainer 69, the output side retainer 72 and the output side press body 40b. The pressure plate 77, as the input side pressure member, indirectly presses the group of plates 66 from the same direction as the roller retainer 69, which serves as the output side pressure member, presses the group of plates 66.

Thus, the clutch boss 48 located within the clutch housing 46 can be downsized by the arrangement that the output side roller retainer 69 and associated members are disposed near the group of plates 66, while the input side pressure plate 77 and associated members are disposed father away from the group of plates 66 than the output side roller retainer 69 and associated members. As a result, a downsizing of the clutch 2 can be realized. Also, assembling of the clutch 2 becomes relatively easy.

The roller retainer 78, which serves as an input side retainer, is disposed farther outwardly than the pressure plate 77 in the vehicle-width direction. The roller retainer 78 is formed in the shape of an orbicular zone when viewed from the direction of axis line AX. The roller retainer 78 faces the surface of the pressure plate 77 that is opposite from the group of plates 66. A plurality of cam surfaces 81 are formed on the surface of the roller retainer 78 on the side of the pressure plate 77. The plurality of cam surfaces 81 is disposed radially from the axis line AX. Each cam surface 81 is formed to extend inwardly in the vehicle-width direction as it extends outwardly in the radial direction. Thus, a space 82, which is narrower with increased distance from the axis line AX, is formed between each of the cam surfaces 81 and the pressure plate 77.

Similar to pressure plate 77, outer ends of the roller retainer 78 in the radial direction engage with the plurality of arms 46d shown in FIG. 4. As a result, the roller retainer 78 is not rotatable relative to the clutch housing 46. In other words, the roller retainer 78 rotates with the clutch housing 46. On the other hand, roller retainer 78 is displaceable relative to the clutch housing 46 in the direction of axis line AX.

The roller retainer 78 is biased inwardly in the vehicle-width direction by a Belleville spring 83, which serves as a biasing member. In other words, the roller retainer 78 is biased toward the side of the group of plates 66 by the Belleville spring 83. The outer circumference of the Belleville spring 83 is fixed in the direction of axis line AX to the clutch housing 46 by a spring stopper 84 and a circlip 85.

Figure 5:
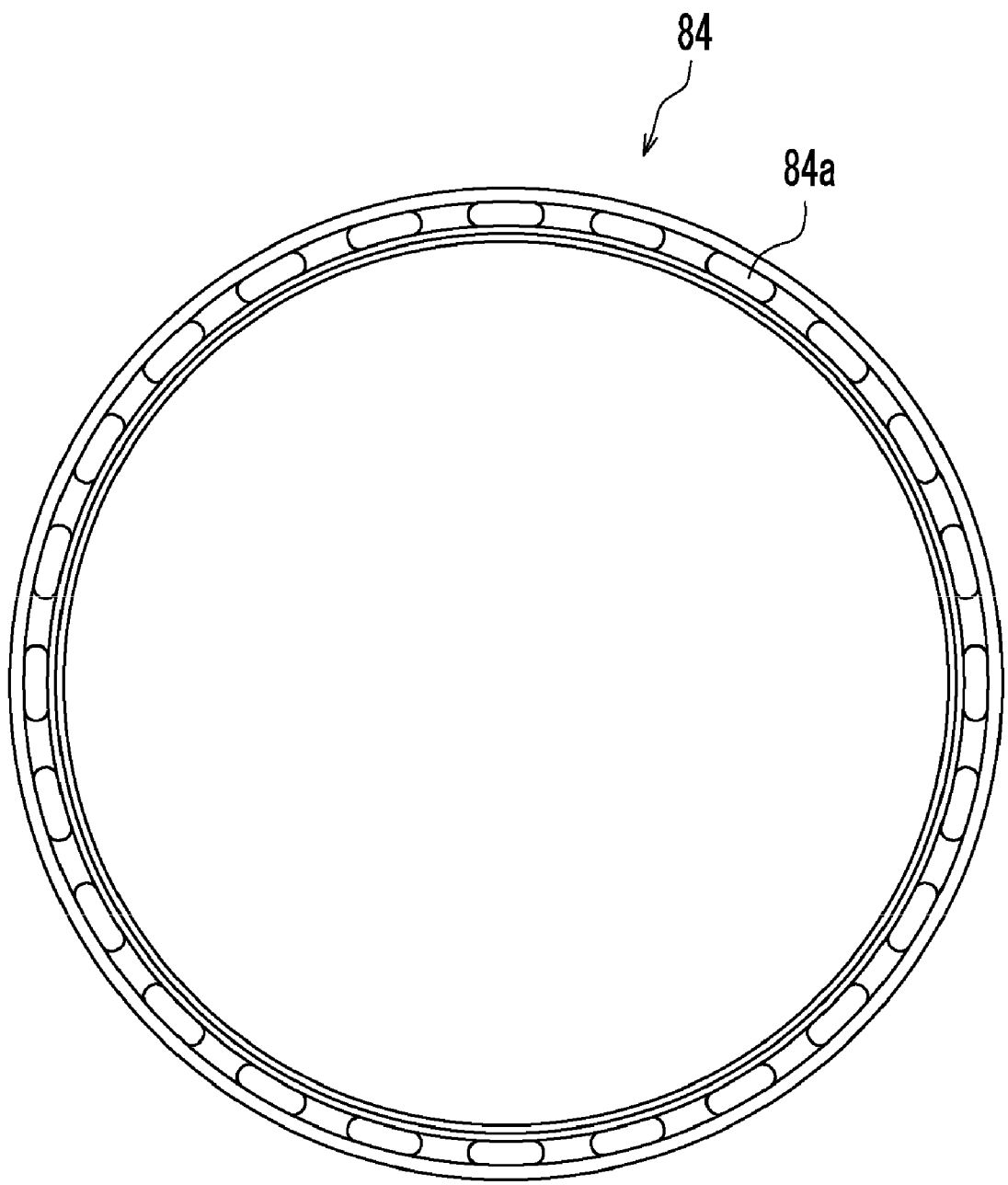
FIG. 5 is a plan view of a spring stopper.

As shown in FIG. 5, a plurality of openings 84a arranged circumferentially are formed in the ring-shaped spring stopper 84. Arms 46d (see FIG. 4) of the clutch housing 46 are inserted respectively into this opening 84a. Thereby, the deformation of the arm 46d of the clutch housing 46 is suppressed.

The Belleville spring 83 is in contact with the inner part of the spring stopper 84 in the radial direction. On the other hand, the outer part of the spring stopper 84 in the radial direction is in contact with the end face 46h formed on the arm 46d. Hereby, the spring stopper 84 is arranged not to move to the left relative to the end face 46h in the vehicle-width direction.

Figure 6:
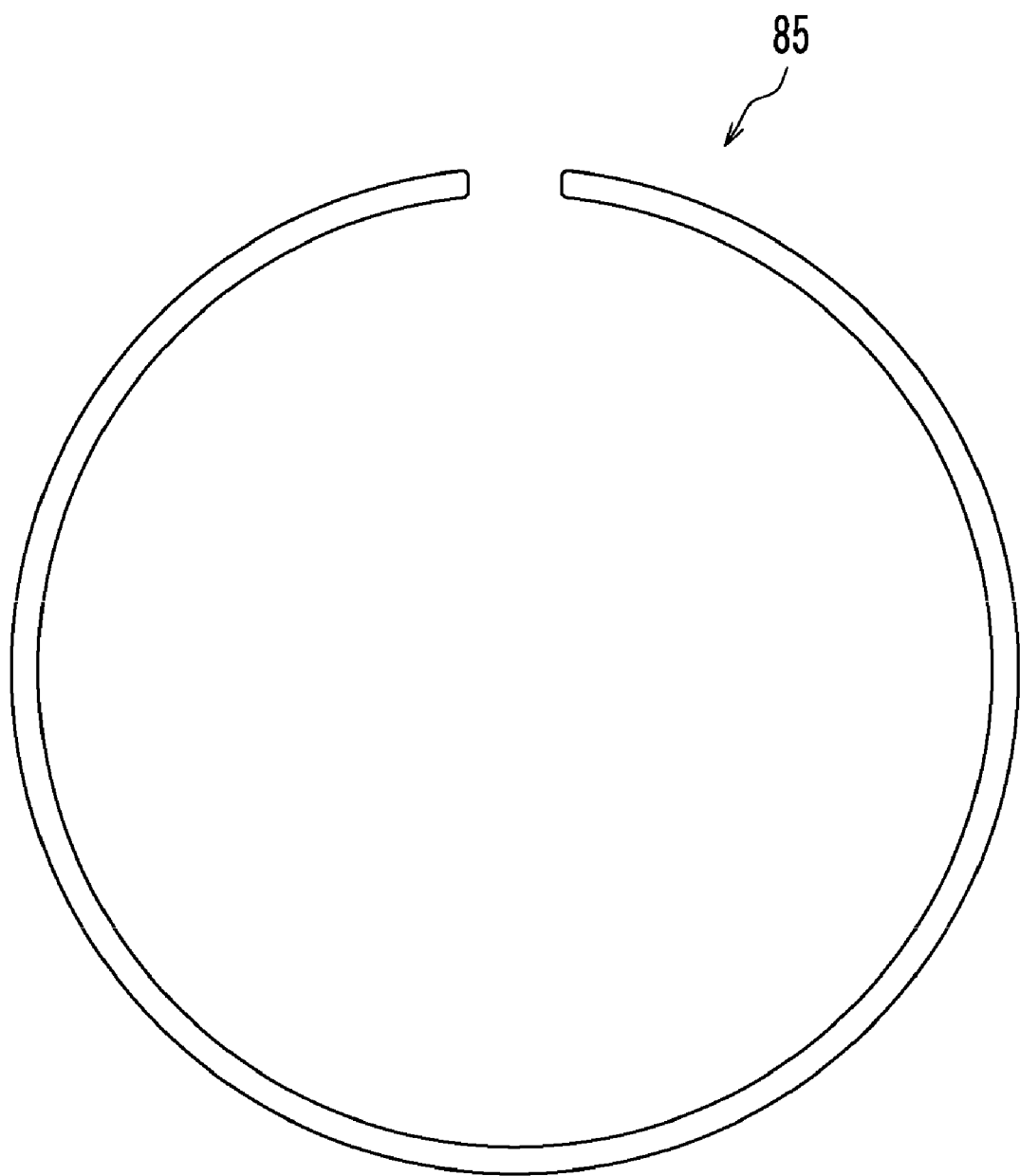
FIG. 6 is a plan view of a circlip.

As shown in FIG. 6, the circlip 85 is formed in the shape of a ring having a notched portion. The circlip 85 is fitted into the linear groove 46g formed on the arm 46d (see FIG. 4). Thus, while movement of the circlip 85 is controlled in the direction of axis line AX, the movement of the spring stopper 84 is also controlled. In other words, spring stopper 84 is fixed in the direction of axis line AX by the circlip 85 and the end face 46h formed on the arm 46d. As a result, the outer side of the Belleville spring 83 in the radial direction is fixed in the direction of axis line AX. Thus, according to the method for fixing the Belleville spring 83 using the circlip 85, the Belleville spring 83 may be easily fixed. In addition, the Belleville spring 83 may be easily removed.

As described above, the roller retainer 78, as the input side retainer, is biased toward the side of the group of plates 66 in the direction of axis line AX by the Belleville spring 83. By the biasing force of the Belleville spring 83, the shaft 68, to which the output side retainer 72 is attached, is biased to the side of the group of plates 66 through the input side roller weight 41 and the pressure plate 77. Therefore, the output side retainer 72 is also biased toward the side of the group of plates 66 by Belleville spring 83 in the axial direction of axis line AX.

Input Side Roller Weight 41

The input side press body 40a is arranged in the space 82. The input side press body 40a is constituted by the plurality of input side roller weights 41. The input side roller weights 41 are more remotely located from the group of plate 66 as compared with the output side roller weights 42 in the direction of axis line AX. In other words, the input side roller weights 41 are located on the right relative to the output side roller weights 42 in the direction of axis line AX. The input side roller weights 41 are more remotely located from the axis line AX as compared with the output side roller weights 42 in the radial direction perpendicular to the axis line AX. Thus, the arrangement of the input side roller weights 41 and the output side roller weights 42, which are obliquely inclined relative to the axis line AX prevents the locational interference between the input side roller weights 41 and the output side roller weights 42. As a result, clutch 2 can be downsized.

The input side roller weights 41 rotate with the rotation of the clutch housing 46. The pressure plate 77 is pressed toward the side of the group of plates 66 by the centrifugal force generated during the rotation, and the input side roller weights 41 move in a direction away from the axis line AX concurrently with pushing the spring 74 outwardly in the vehicle-width direction. Hereby, the roller retainer 69 moves toward the side of the group of plates 66, and the group of plates 66 transition into a pressed-contact state.

The shape of the input side roller weight 41 is not specifically limited as long as the input side roller weight can turn with the rotation of the shaft 68 and is displaceable inwardly and outwardly in the radial direction. Specifically in the present embodiment, the input side roller weight 41 has an approximately cylindrical shape.

More specifically, the input side roller weight 41, in relation to the axis direction of the input side roller weight 41, is divided into a central portion and two lateral portions. The two lateral portions are non-rotatable relative to each other. On the other hand, the central portion is rotatable with respect to the two lateral portions. The cam surface 81 is configured to be in contact with only the central portion. In other words, only the central portion that is in contact with the cam surface 81 can rotate with respect to the other portions. By doing so, sliding friction between the cam surface 81 and the input side roller weight 41 can be reduced. As a result, abrasion of the input side roller weight 41 can be reduced.

Weight of Input Side Roller Weight 41 and of Output Side Roller Weight 42

In this embodiment, the total weight of the plurality of output side roller weights 42 is set to be heavier than the total weight of the plurality of input side roller weights 41. For example, the provided quantity of output side roller weights 42 and input side roller weights 41 may be set to be equal, and the weight per each output side roller weight 42 may be set to be heavier than the weight per each input side roller weight 41. Alternatively, the weight per each output side roller weight 42 and the weight per each input side roller weight 41 may be set approximately equal, and the quantity of output side roller weights 42 may be more than the quantity of input side roller weights 41. Also, the quantity of output side roller weights 42 may be set to be more than the quantity of input side roller weights 41, and the weight per each output side roller weight 42 may be set to be heavier than the weight per each input side roller weight 41.

However, the present invention is not limited to the above configuration. For example, the total weight of the plurality of output side roller weights 42 may be set to be lighter than the total weight of the plurality of input side roller weights 41. For example, the provided quantity of output side roller weights 42 and input side roller weights 41 may be set to be equal, and the weight per each output side roller weight 42 may be set to be lighter than the weight per each input side roller weight 41. Alternatively, the weight per each output side roller weight 42 and the weight per each input side roller weight 41 may be set approximately the same, and the quantity of output side roller weights 42 may be less than the quantity of input side roller weights 41. Also, the quantity of output side roller weights 42 may be set to be less than the quantity of input side roller weights 41, and the weight per each output side roller weight 42 may be set to be lighter than the weight per each input side roller weight 41.

Biasing Force of Input Side Off Spring 79 and Output Side Off Spring 71

Also, in the present embodiment, the total biasing force of the plurality of output side off springs 71 is set to be weaker than the total biasing force of the plurality of input side off springs 79. Thus, by setting the total weight of the plurality of output side roller weights 42 and the plurality of input side roller weights 41, and the total biasing force of the plurality of output side off springs 71 and the input side off springs 79, the rotational speed of the clutch boss 48 at which the output side roller weights 42 start moving in a centrifugal direction is set to be lower than the rotational speed of the clutch housing 46 at which the input side roller weights 41 start moving in a centrifugal direction.

Specifically, the provided quantity of output side off springs 71 and input side off springs 79 may be set to be equal, and the biasing force of each of the output side off springs 71 may be set to be weaker than the biasing force of each of the input side off springs 79. Alternatively, the biasing force of each of the output side off springs 71 and the biasing force of each of the input side off springs 79 may be set to be approximately the same, and the provided quantity of output side off springs 71 may be less than the quantity of input side off springs 79. Also, the quantity of the output side off springs 71 may be set to be more than that of input side off springs 79, and the biasing force of each of the output side off springs 71 may be set to be weaker than the biasing force of the input side off springs 79.

However, the present invention is not limited to the above configuration. For example, the total biasing force of the plurality of output side off springs 71 may be set to be stronger than the total biasing force of the plurality of input side off springs 79. Specifically, the provided quantity of output side off springs 71 and the quantity of input side off springs 79 may be set to be equal, and the biasing force of each of the output side off springs 71 may be set to be stronger than the biasing force of each of the input side off springs 79. Alternatively, the biasing force of each of the output side off springs 71 and the biasing force of each of the input side off springs 79 may be set to be approximately the same, and the provided quantity of output side off springs 71 may be set to be more than the quantity of input side off springs 79. Also, the provided quantity of output side off springs 71 may be set to be less than the quantity of input side off springs 79, and the biasing force of each of the output side off springs 71 may be set to be stronger than the biasing force of the input side off spring 79.

Clutch Release Mechanism 86

A clutch release mechanism 86, which serves as a releasing mechanism from the pressed-contact state, is provided in the clutch 2 of the present embodiment. The clutch release mechanism 86 forces the release of the pressed-contact state of the group of plates 66 by the force applied by the rider sitting on the motorcycle 1. Particularly, the clutch release mechanism 86 allows the rider sitting on the motorcycle 1 to disengage the clutch 2.

The present embodiment describes an example in which the rider of the motorcycle 1 operates a clutch operation means such as a clutch lever, a clutch pedal, or the like (not shown), thereby applying the force applied to the clutch lever or the clutch pedal to the clutch release mechanism 86 to forcibly release the pressed-contact state of the group of plates 66. However, the present invention is not limited to the above configuration. For example, the rider of the motorcycle 1 may operate the clutch lever or the clutch pedal (not shown), thereby actuating a drive mechanism such as an oil pump, which may be separately provided, to apply a force generated by the oil pump to the clutch release mechanism 86 and to forcibly release the pressed-contact state of the group of plates 66.

The clutch release mechanism 86 includes a push rod 43 shown in FIG. 1 and FIG. 2, and a push rod drive mechanism 87 shown in FIG. 2 and FIG. 7. As shown in FIG. 1, the push rod 43 is disposed within a through hole 33a formed within the main shaft 33 so as to penetrate the main shaft 33 in the direction of axis line AX. The through hole 33a also serves as an oil supply hole for supplying oil to each of the sliding parts or the like of the clutch 2. Specifically, oil is supplied to each of the sliding parts of the clutch 2 through a gap 89 between the inner wall of the through hole 33a and the push rod 43.

The push rod 43 includes a short push rod 43a and a long push rod 43b. The short push rod 43a is disposed relatively outwardly in the vehicle-width direction of the long push rod 43b. The right end of the short push rod 43a is in contact with the shaft 68. An O-ring 88 is attached to the short push rod 43a at an approximately central portion in the axial direction thereof. As a result, the oil, which is supplied through gap 89, is prevented from reaching to the right relative to O-ring 88 in the vehicle-width direction. Also, providing the O-ring 88 allows the short push rod 43a to rotate with the main shaft 33. On the other hand, the long push rod 43b does not rotate with the main shaft 33. Because of this, when the main shaft 33 rotates, the short push rod 43a rotates relative to the long push rod 43b. In view of this, the end face of the short push rod 43a on the side of the long push rod 43b is formed into a curved surface projecting toward the side of the long push rod 43b. This reduces the sliding resistance between the short push rod 43a and the long push rod 43b when the short push rod 43a rotates.

As shown in FIG. 2 and FIG. 7, the left end of long push rod 43b is located to the left relative to the left edge of the main shaft 33, and extends into the push rod drive mechanism 87. FIG. 7 is a sectional view of the push rod drive mechanism 87. The lower half portion above the axial line AX in FIG. 7 shows the state when the clutch release mechanism 86 is not driven. In other words, the lower half portion below axial line AX in FIG. 7 shows the state when the push rod 43 is displaced relatively to the left and thus the shaft 68 is not displaced to the right by the push rod 43. On the other hand, the upper half portion above the axis line AX in FIG. 7 shows the state when the clutch release mechanism 86 is driven. In other words, the upper half portion above the axis line AX in FIG. 7 shows the state when the push rod 43 is displaced relatively to the right—relative to the nondriven state shown below the axis line AX—and thus the shaft 68 is displaced to the right by the push rod 43.

As shown in FIG. 7, the push rod drive mechanism 87 includes a cylinder 90 and a piston 91. The piston 91 may be slidably moved in the axial direction of axis line AX with respect to cylinder 90. The piston 91 is attached to the long push rod 43b. Consequently, slidably moving the piston 91 allows the long push rod 43b to move in the axial direction of axis line AX.

Figure 10:
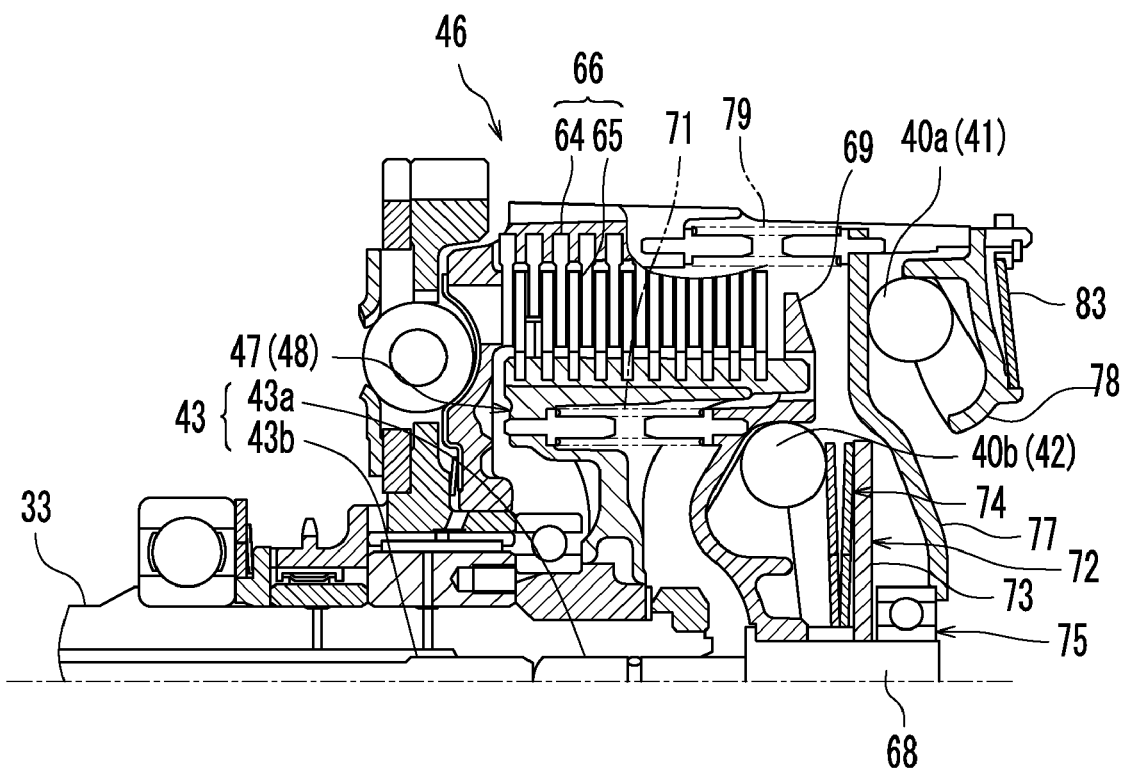
FIG. 10 is a cross-sectional view showing the state when the clutch of FIG. 1 is disengaged forcibly by a clutch release mechanism.

As schematically illustrated in reference to FIG. 7, chamber 92 is comparted and formed between the piston 91 and the cylinder 90. Chamber 92 is filled with oil. The rider sitting on the motorcycle 1 operates the clutch lever or the clutch pedal which increases the internal pressure in chamber 92 and causes the piston 91 and the long push rod 43b to move to the right. Thus, as shown in FIG. 10, the shaft 68, the pressure plate 77 and the output side retainer 72, which is attached to the shaft 68, also move to the right. As a result, the roller retainer 69 moves to the right, and the pressed-contact state of the group of plates 66 is released.

A compression coil spring 93 is disposed between the piston 91 and the crankcase 31. The piston 91 is biased by the compression coil spring 93 to the left. In other words, the push rod 43 is biased to be displaced to the left, a direction in which the clutch 2 may be engaged. Because of this, when the rider sitting on the motorcycle 1 releases (stops operating) the clutch lever or the clutch pedal, the push rod 43 is certainly moved to the left.

For example, if compression coil spring 93 was not provided, even if the clutch lever and the clutch pedal were released, there may be the situation that the push rod 43 would still be located to the right. In such case, for example, if the engine 4 is stopped and the clutch 2 is disengaged, the push rod 43 cannot be further moved to the right. Therefore, the rider sitting on the motorcycle 1 would not be able to operate the clutch lever or the clutch pedal. Accordingly, for example, when the motorcycle 1 cannot start the engine 4 in a state where the clutch lever or the clutch pedal is not operated, the engine 4 cannot be started.

In contrast, in the motorcycle 1 according to the present embodiment, because the compression coil spring 93 is disposed, as described above, the situation that the push rod 43 is still located to the right is avoided when the clutch lever or the clutch pedal is released. Therefore, in the shutdown period of the engine 4, the rider on the motorcycle 1 can always operate the clutch lever or the clutch pedal.

As described above, in the present embodiment, the pressure plate 77, which serves as the input side pressure member, indirectly presses the group of plates 66 in the same direction as the direction in which the roller retainer 69, which serves as the output side pressure member, presses the group of plates 66.

For example, when the pressure plate 77 and the roller retainer 69 mutually press the group of plates 66 from the opposite direction, the position of the pressure plate 77 when the clutch 2 is disengaged is different depending on the position of the roller retainer 69 in the direction of axis line AX. Specifically, for example, when the roller retainer 69 is located relatively to the right in the direction of axis line AX, the clutch 2 is not disengaged if the pressure plate 77 is not displaced relatively to the right. On the other hand, for example, when the roller retainer 69 is located relatively to the left in the direction of axis line AX, the clutch 2 is disengaged even if the pressure plate 77 is not displaced remarkably to the right. Because of this, when the pressure plate 77 and the roller retainer 69 mutually press the group of plates 66 from the opposite direction, the position of the push rod 43 when the clutch 2 is disengaged is different depending on the position of the roller retainer 69 in the axial direction of axis line AX.

In contrast, in the present embodiment, when the pressure plate 77 and the roller retainer 69 are disposed on the same side with respect to the group of plates 66, the position of the push rod 43 when the clutch 2 is disengaged becomes constant.

Operation of Clutch 2

Figure 8:
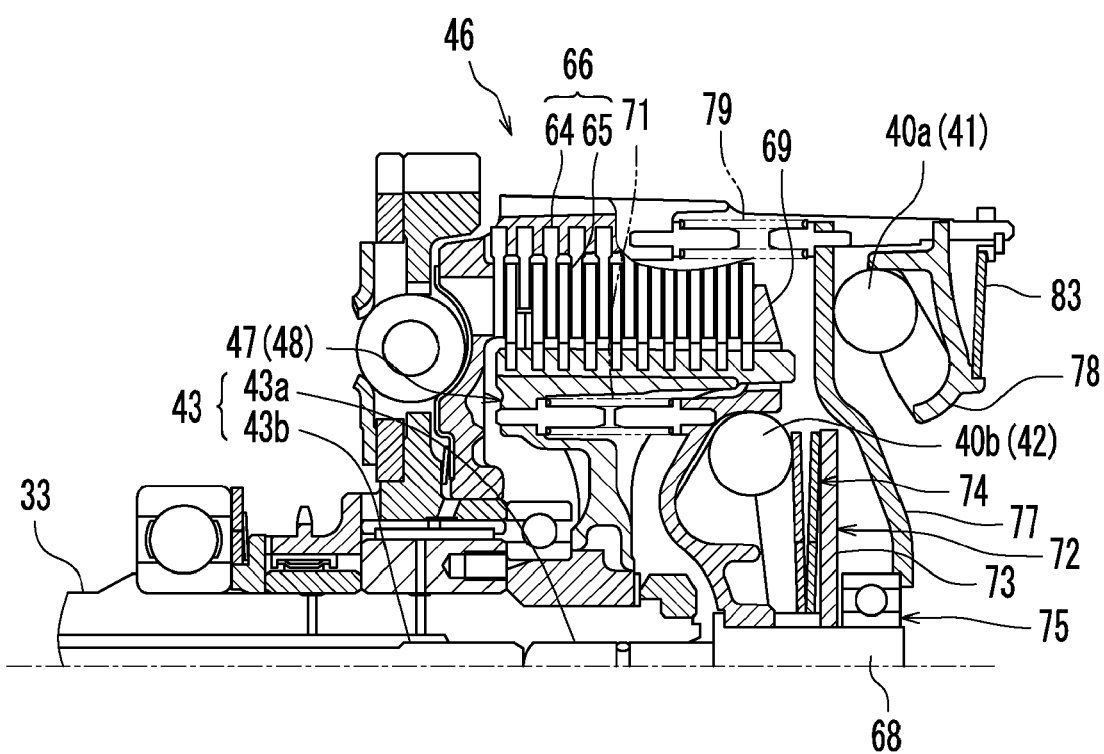
FIG. 8 is a cross-sectional view of the clutch of FIG. 1 while being engaged with a main shaft rotating at relatively high speed.
Figure 9:
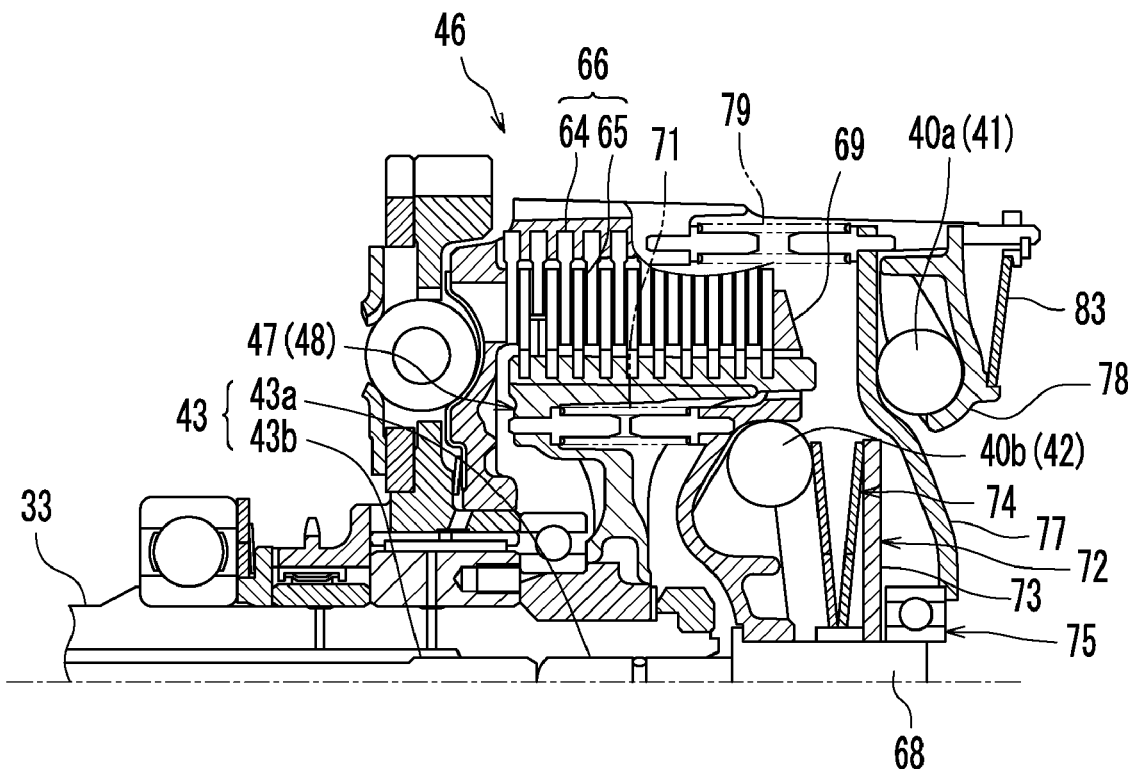
FIG. 9 is a cross-sectional view of the clutch of FIG. 1 at a moment when the rotational speed of the main shaft is relatively high while the rotational speed of the crankshaft is relatively low.

Next, referring to FIG. 1, and FIGS. 8 to 10, the operation of the clutch 2 will be described. FIGS. 8 to 10 show only a section of a portion of one side relative to the axis line AX of the clutch 2 in view of the clutch 2 being rotationally symmetric in relation to the axis line AX.

When Clutch 2 is Engaged

The upper half portion of the clutch 2 above the axis line AX shown in FIG. 1 illustrates the state where the engine 4 is in an idling state and the clutch 2 is not engaged. On the other hand, the lower half portion of the clutch 2 below the axis line AX shown in FIG. 1 illustrates an instantaneous state where the rotational speed of the crankshaft 32 is increased and the clutch 2 is engaged.

When the engine 4 is started and is in an idling state, the clutch housing 46 is rotating with the crankshaft 32. However, the rotational speed of the clutch housing 46 is relatively low. Because of this, the centrifugal force acting on the input side roller weight 41 is relatively small. Therefore, the input side roller weight 41 is located relatively on the inside. Therefore, the pressure plate 77, the shaft 68 and the output side retainer 72 are located relatively to the right by the biasing force of the input side off spring 79. Also, in the idling state, the main shaft 33 is not rotating or is rotating at a relatively low rotational speed. Therefore, the centrifugal force acting on the output side roller weight 42 is relatively small. Accordingly, the output side roller weight 42 is located relatively inwardly. Therefore, the roller retainer 69 is located relatively to the right by the biasing force of the output side off spring 71. As a result, the distance between the roller retainer 69 and the bottom portion 46a of the clutch housing 46 is relatively large, and the group of plates 66 is in the non-pressed contact state. Therefore, rotation of the clutch housing 46 is not transmitted to the clutch boss 48.

If the rotational speed of crank shaft 32 is relatively increased, the rotational speed of the clutch housing 46 is also relatively increased. As the rotational speed of the clutch housing 46 is increased, the centrifugal force acting on input side roller weight 41 is increased. As a result, the input side roller weight 41 moves outwardly. Therefore, the pressure plate 77 is pressed to the left by the input side roller weight 41. Hereby, the pressure plate 77, the shaft 68 and the output side retainer 72 move to the left while opposing the biasing force by the input side off springs 79. As a result, the roller retainer 69 also moves to the left while opposing the biasing force of the output side off springs 71 through the output side roller weight 42. In other words, the roller retainer 69 also moves to the side of the group of plates 66. Hereby, the group of plates 66 transitions into a pressed-contact state, and the clutch 2 is engaged. The state at this time is illustrated in the lower half portion below the axis line AX in FIG. 1.

When the clutch 2 is engaged, the rotation of the clutch housing 46 is transmitted to the clutch boss 48 through the group of plates 66. Hereby, the clutch boss 48 rotates with the clutch housing 46. When the clutch boss 48 begins to rotate, the output side roller weight 42 begins to turn accordingly. Therefore, the centrifugal force acting on the output side roller weight 42 is increased. As a result, the output side roller weight 42 moves outwardly in a centrifugal direction. FIG. 8 illustrates the state at that time.

As shown in the lower half portion below the axis line AX in FIG. 1, the clutch 2 is configured so that the clutch 2 is engaged when only the input side roller weight 41 moves outwardly in a centrifugal direction. In other words, the clutch 2 is configured in such a way that the group of plates 66 transitions into a pressed-contact state when only the input side roller weight 41 moves outwardly in the centrifugal direction. Therefore, from the state that only the input side roller weight 41 is moved outwardly in a centrifugal direction, the roller retainer 69 cannot be substantially moved to the left any more. Therefore, even if the output side roller weight 42 further moves outwardly in the centrifugal direction from the state, the roller retainer 69 can not move substantially nearer to the group of plates 66. Instead, as shown in FIG. 8, the spring 74 and the Belleville spring 83 are deformed. Therefore, in the clutch 2 according to the present embodiment, the capacity of the clutch 2 is determined by elastic force of the Belleville spring 83.

When Clutch 2 is Disengaged

Next, the case where the clutch 2 is disengaged will be described. In the state where the clutch 2, as shown in FIG. 8, is engaged as the rotational speed of the crankshaft 32 decreases, the centrifugal force acting on the input side roller weight 41 and the output side roller weight 42 would also decrease. Herein, in the present embodiment, as described above, the rotational speed of the clutch boss 48 at which the output side roller weight 42 starts moving in the centrifugal direction is set to be lower than that of the roller weight 41. In other words, the input side roller weight 41 moves inwardly first in the centrifugal direction if the rotational speed decreases when the clutch housing 46 and the clutch boss 48 rotate integrally. However, the output side roller weight 42 does not move inwardly in the centrifugal direction immediately. Because of this, even if the rotational speed of the crankshaft 32 decreases, the clutch 2 is not necessarily disengaged immediately. Because the clutch 2 remains engaged, engine braking is exerted. Hereby, the rotation of the main shaft 33 decreases gradually. Accordingly, the centrifugal force acting on the output side roller weight 42 decreases gradually. And, when the rotational speed of the main shaft 33 becomes equal to or less than a predetermined rotational speed, the output side roller weight 42 is also moved inwardly in the centrifugal direction. As a result, the roller retainer 69 moves to the right, and the clutch 2 is disengaged.

In other words, in the clutch 2 according to the present embodiment, even if the rotational speed of the crankshaft 32 becomes low, the engagement state of the clutch 2 is maintained if the rotational speed of the main shaft 33 is relatively high. Even if the rotational speed of the clutch housing 46 decreases to the rotational speed at which the input side roller weight 41 moves inwardly in the centrifugal direction, the clutch 2 remains engaged until the rotational speed of the clutch housing 46 and the clutch boss 48 reaches the rotational speed at which the output side roller weight 42 moves inwardly in the centrifugal direction.

Specifically, in the present embodiment, the following relationship is satisfied:

$$r_1 > r_2 \qquad (1),$$

wherein $r_1$ is the rotational speed for input side roller weight 41 to move inwardly in the centrifugal direction, and $r_2$ is the rotational speed for output side roller weight 42 to move inwardly in the centrifugal direction.

For example, in the case where the output side roller weight 42 is not provided and the pressure plate 77 directly presses the group of plates 66, the clutch 2 will be disengaged when the rotational speed of the clutch housing 46 reaches $r_1$.

In contrast, in the present embodiment in which the output side roller weight 42 is provided, the clutch 2 will not be disengaged until the rotational speed of the clutch housing 46 becomes $r_2$, which is lower than $r_1$. In other words, the engagement state of clutch 2 will be maintained until the rotational speed of the clutch housing 46 becomes relatively lower. As a result, engine braking can be exerted in the relatively low engine speed range.

Also, for example, when the rotational speed of the main shaft 33 becomes relatively high even if the engine 4 is in an idling state and the rotational speed of the crankshaft 32 is relatively low, only the output side roller weight 42 moves outwardly in the centrifugal direction, as shown in FIG. 9. Hereby, the roller retainer 69 is pressed to the left, and the group of plates 66 is pressed and contacted. As a result, as shown in FIG. 9, the clutch 2 is engaged. When the clutch 2 is engaged, the clutch housing 46 starts rotating with the clutch boss 48. The rotation of the clutch housing 46 is transmitted to the crankshaft 32, and engine braking is exerted. Hereby, the rotational speed of the clutch 2 and the main shaft 33 are reduced. And, when the rotational speed of the main shaft 33 and the clutch 2 become lower than the above rotational speed $r_2$, the clutch 2 is disengaged.

Thus, in the present embodiment, even if the rotational speed of crank shaft 32 is relatively low, the clutch 2 is engaged when the rotational speed of the main shaft 33 is relatively high. As a result, until the rotational speed of the main shaft 33 becomes low, engine braking can be exerted.

This effect could be also obtained in the case when the rotational speed at which the output side roller weight 42 moves inwardly in the centrifugal direction is higher than that of the input side roller weight 41.

Referring to FIGS. 11 to 17, several alternative embodiments will now be generally described in detail below.

In the description of alternative embodiments 1 to 4, components which perform substantially the same functions are described using the same reference numerals as the above embodiments with the respective description thereof being omitted.

Alternative Embodiment 1

The above-described embodiment concerns the exemplary construction in which output side retainer 72 uses spring 74. However, the present invention is not limited to this configuration. For example, as shown in FIG. 11, a plate 101 having no biasing member may be disposed in place of the output side retainer 72 having the spring 74.

Figure 11:
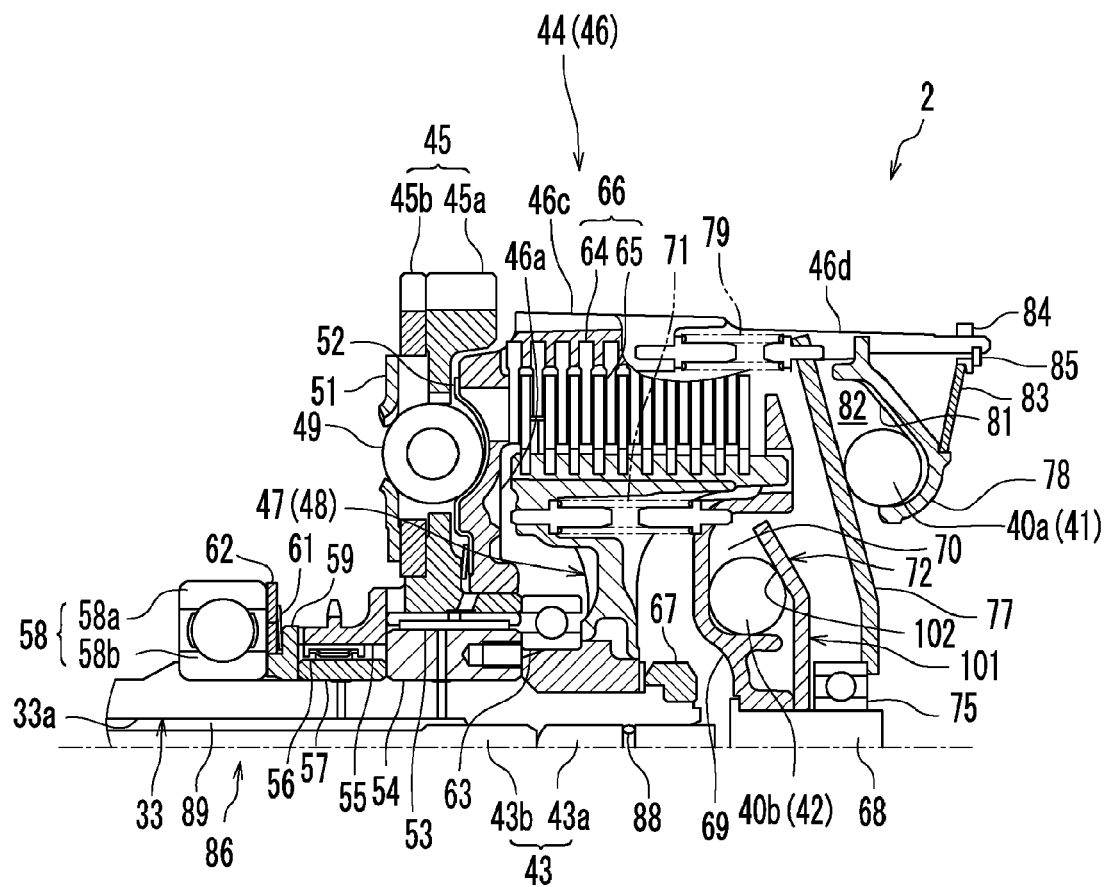
FIG. 11 is a cross-sectional view of a centrifugal clutch according to an alternative embodiment 1.

In the example shown in FIG. 11, the outer portion of the output side retainer 72 in the radial direction is formed so as to extend to the left as it goes away from the axis line AX in the radial direction. Hereby, a cam surface 102 that extends to the left as it goes away from the axis line AX in the radial direction is formed. As a result, the width of formed space 70 (in the direction of axis line AX) becomes narrower with increased distance from the axis line AX in the radial direction.

Alternative Embodiment 2

Figure 12:
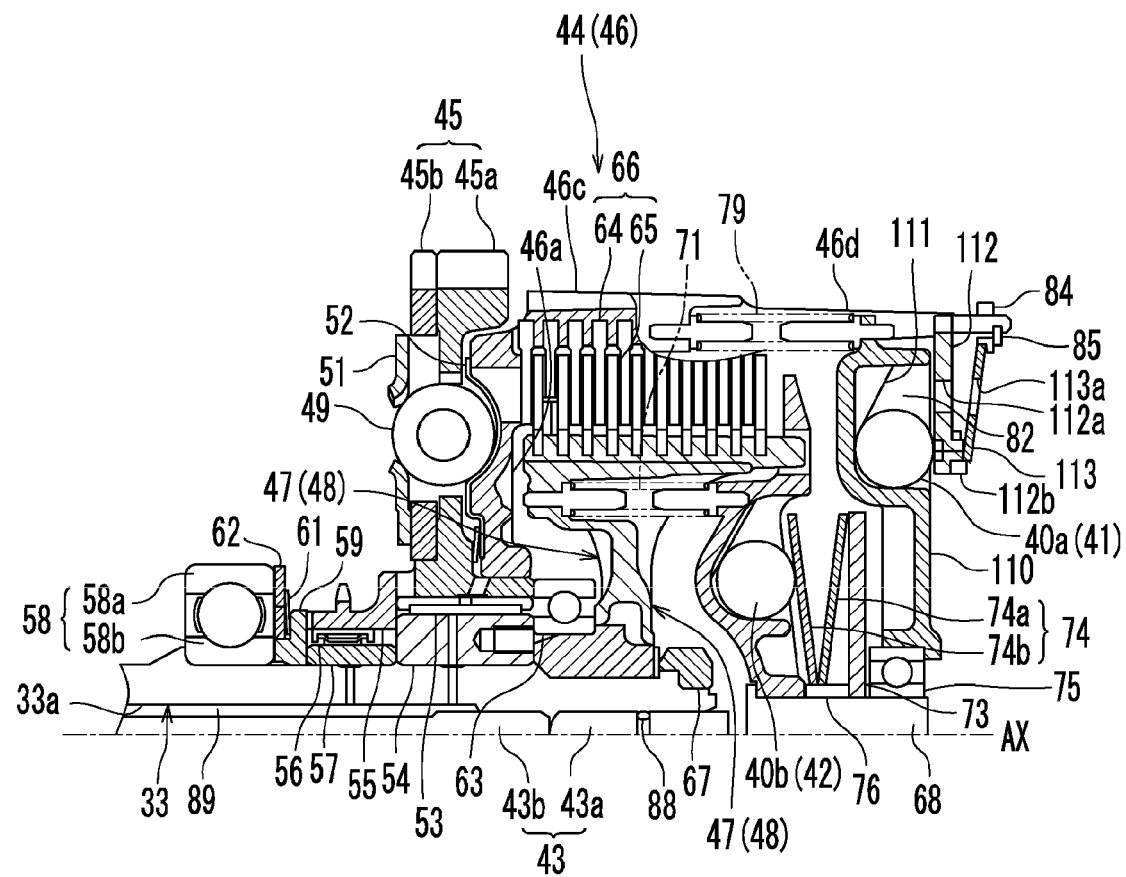
FIG. 12 is a cross-sectional view of a centrifugal clutch according to an alternative embodiment 2.

FIG. 12 is a sectional view of the clutch according to alternative embodiment 2. In this embodiment, a roller retainer 110 is provided in place of pressure plate 77. The central portion of the roller retainer 110 is fixed to the outer ring 75b of the bearing 75. Hereby, the roller retainer 110 is rotatable with respect to the shaft 68 and the main shaft 33.
Roller Retainer 110

Figure 15:
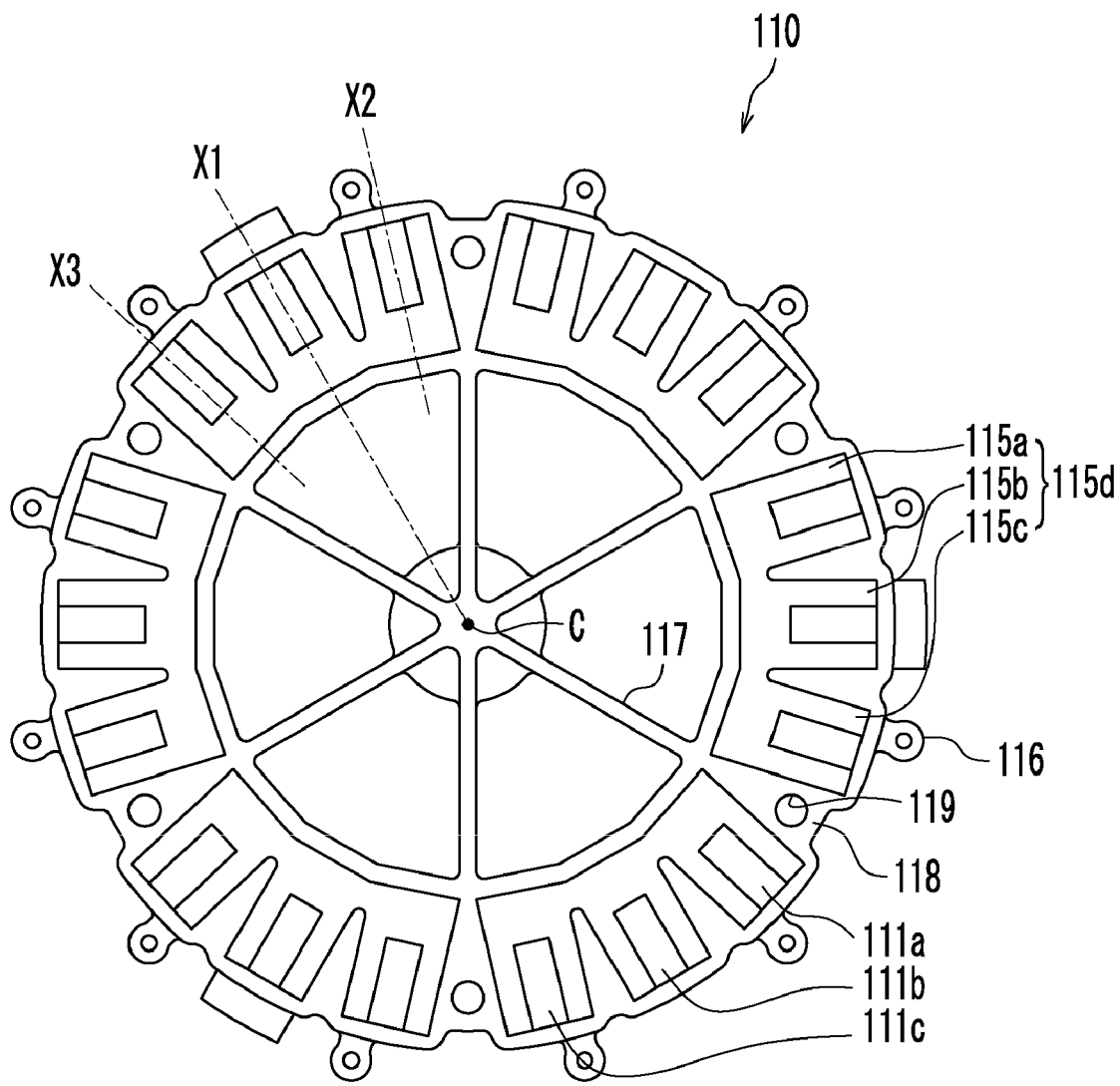
FIG. 15 is a plan view of a roller retainer according to alternative embodiment 2.

As shown in FIG. 15, outwardly projecting protrusions 116 are formed in an outer peripheral portion of the roller retainer 110. Engagement between the projecting protrusions 116 and the arms 46d of the clutch housing 46 prevents the roller retainer 110 from rotating with respect to the clutch housing 46. Therefore, the roller retainer 110 rotates with the clutch housing 46.

A plurality of guide parts 115 is formed on the outside portion of the roller retainer 110 in a radial direction. The plurality of guide parts 115 include a first guide part 115a, a second guide part 115b, and a third guide part 115c. The first guide part 115a, the second guide part 115b, and the third guide part 115c constitute a group of guides 115d. Thus, in alternative embodiment 2, there are six groups of guides 115d arranged in a circumferential direction. In other words, a total of eighteen (18) guide parts 115 are formed.

The direction X1 in which second guide part 115b extends is approximately the same as the radial direction. On the other hand, the direction X2 in which the first guide part 115a extends and the direction X3 in which a third guide part 115c extends are slightly different from the radial direction. By disposing the first to third guide parts 115a to 115c in this manner, the distance between the outside portion of the first guide part 115a in the radial direction and the outside portion of the second guide part 115b in the radial direction is set to be relatively narrow. The distance between the outside portion of the third guide part 115c in the radial direction and the outside portion of the second guide part 115b in the radial direction is also set to be relatively narrow. As a result, the outside portion of a group of guides 115d in the radial direction has a relatively narrow width in the circumferential direction. Therefore, it is relatively easy to secure a space for forming a rib 118 having a relatively wide width between adjacent groups of guides 115d. A threaded hole 119 is formed in the outside portion of the rib 118 in the radial direction, which portion is formed relatively wide, as shown in reference to FIG. 15.

Each of the ribs 118 is formed continuously with a rib 117 which is located relatively inside in the radial direction and extend radially from a center C. Hereby, a plurality of ribs, which extend from the center C to the outer circumferential portion of the roller retainer 110, is formed. Therefore, the stiffness of roller retainer 110 is improved. The threaded hole 119 is formed in each of the ribs 118.

Figure 16:
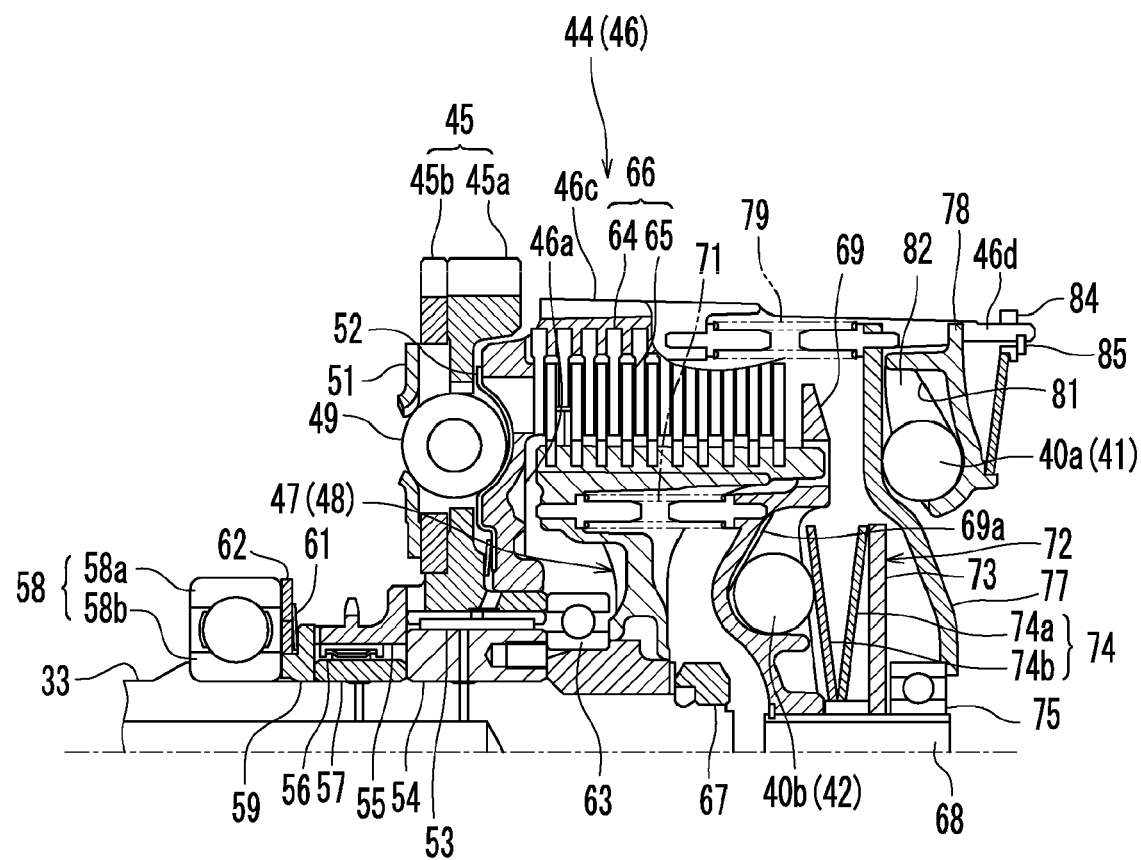
FIG. 16 is a cross-sectional view of a centrifugal clutch according to an alternative embodiment 3.

A cam surface 111 is formed in each of the guide parts 115. Specifically, the cam surface 111 extends in the direction in which the guide part 115 extends. The cam surface 111 extends from the middle to the outer end of guide part 115 in the radial direction. The cam surface 111 is in contact with the rotatable middle part of the roller weight 41. As best seen in FIG. 16, each cam surface 111 projects from the surface of the corresponding guide part 115.
Plate 112

Figure 14:
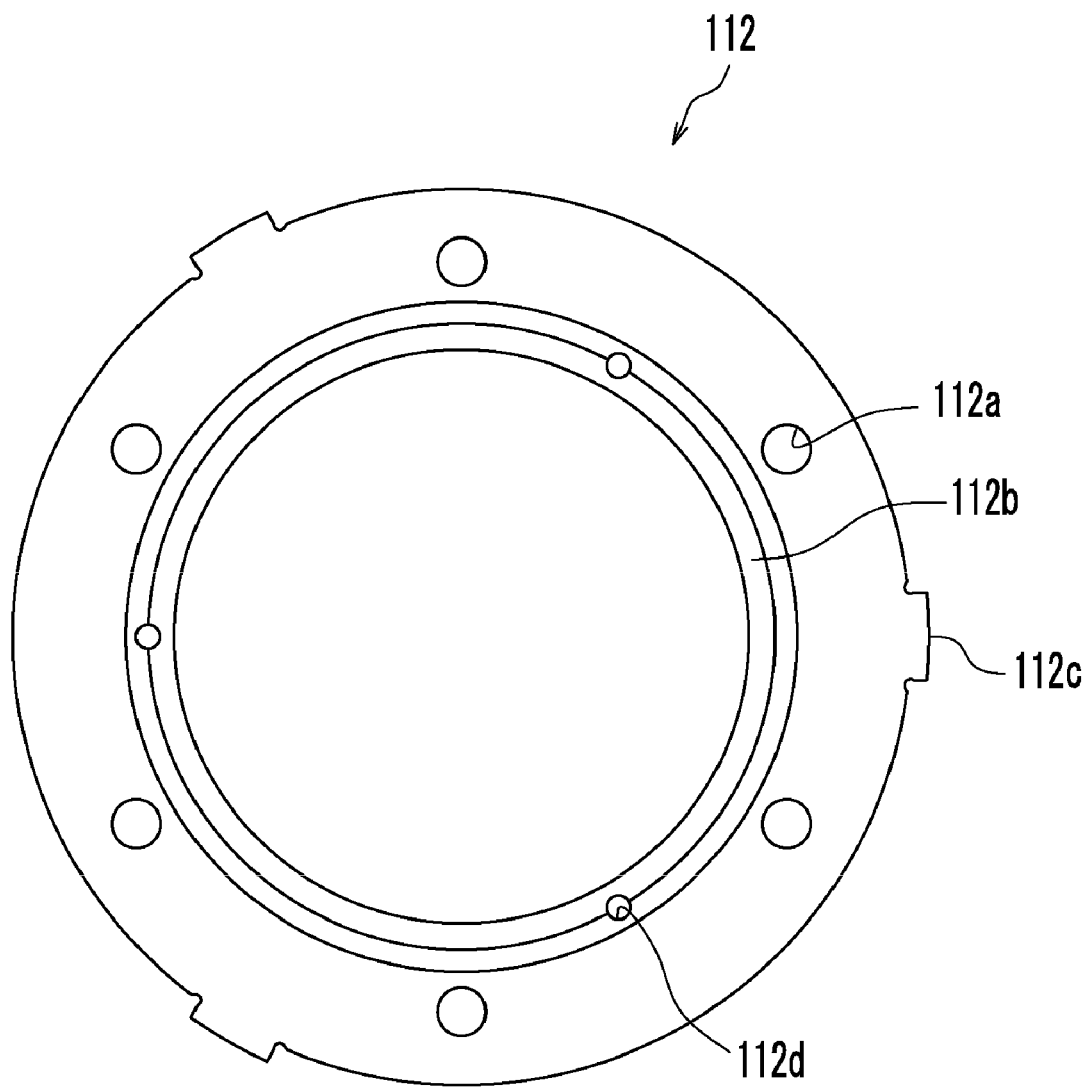
FIG. 14 is a plan view of a plate according to alternative embodiment 2.

As shown in FIG. 12, in alternative embodiment 2, a ring-shaped retainer plate 112 is disposed facing the roller retainer 110. As shown in FIG. 12, the retainer plate 112 has a flat plate shape in a side view. As shown in FIG. 14, projecting tab portions 112c, which project outwardly in the radial direction, are formed in the outer peripheral part of the plate 112. The engagement between projecting tab portions 112c and the arms 46d of the clutch housing 46 prevents the plate 112 from rotating with respect to the clutch housing 46. Therefore, the plate 112 rotates with the clutch housing 46. On the other hand, the plate 112 is displaceable in the axial direction of axis line AX.

As shown in FIG. 12 and FIG. 14, a projecting portion 112b is formed in the inner portion of the plate 112 in the radial direction. Also, a plurality of through holes 112a, which are arranged in the circumferential direction, are formed approximately in the middle portion of the plate 112 in the radial direction.

Belleville Spring 113

As shown in FIG. 12 in the alternative embodiment 2, as in the above described embodiment, the outer ends of a Belleville spring 113 in the radial direction are fixed to the clutch housing 46 in the direction of axis line AX by the spring stopper 84 and the circlip 85.

Figure 13:
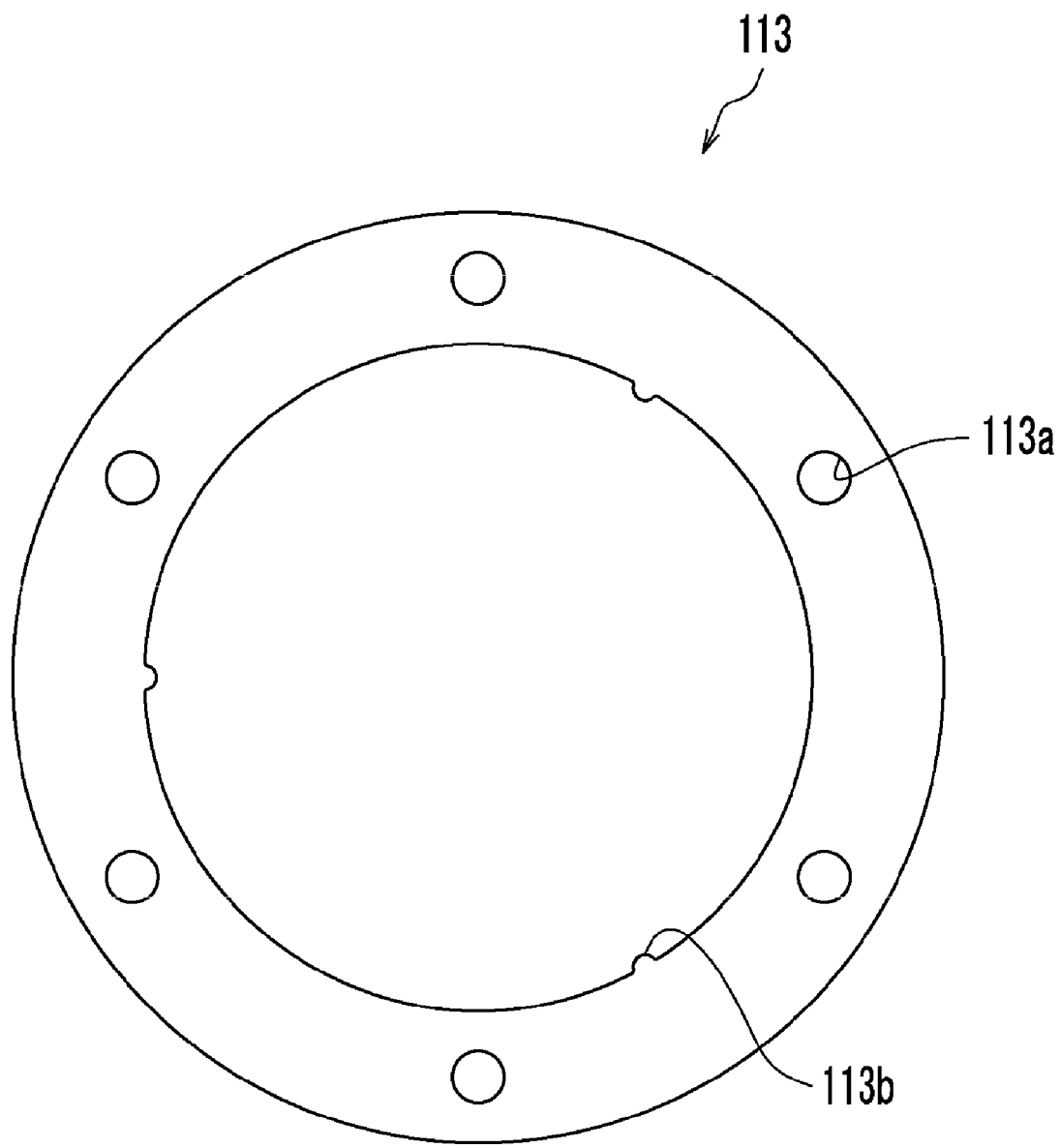
FIG. 13 is a plan view of a Belleville spring according to alternative embodiment 2.

As shown in FIG. 13, in the inner end of the Belleville spring 113 in the radial direction, a plurality of projecting portions 113b, which project inwardly in the radial direction, are formed. The projecting portions 113b are engaged with corresponding depressed portions 112d of the plate 112 shown in FIG. 14. Hereby, in the circumferential direction, the Belleville spring 113 is fixed to the plate 112. Also, a plurality of through holes 113a, which are arranged in the circumferential direction, are formed in approximately the central portion of the Belleville spring 113 in the radial direction.

Assembly of Roller Retainer 110

The clutch according to the alternative embodiment 2 is assembled, by inserting a screw through the through hole 113a in the Belleville spring 113 and the through hole 112a in the plate 112 and fastening the screw to the threaded hole 119 in the roller retainer 110. The roller retainer 110, the input side roller weight 41, the plate 112 and the Belleville spring 113 are thereby integrated together. At the same time, the widths of the roller retainer 110, the input side roller weight 41, the plate 112 and the Belleville spring 113 in the axial direction of axis line AX are narrowed. In such a state, the integrated roller retainer 110, input side roller weight 41, plate 112 and Belleville spring 113 are assembled into the clutch housing 46. Afterwards, the spring stopper 84 and the circlip 85 are attached.

In this case, since the widths of the roller retainer 110, the input side roller weight 41, the plate 112 and the Belleville spring 113 in the axial direction of axis line AX are kept narrow, the spring stopper 84 and the circlip 85 can be attached relatively easily. After the spring stopper 84 and the circlip 85 are attached, a screw which was fastened to the threaded hole 119 is loosened and removed, and the clutch according to alternative embodiment 2 may be finally built.

Alternative Embodiment 3

In the above embodiment, the clutch 2 having the clutch release mechanism 86 is described as an example. However, the present invention is not limited to the configuration of the above embodiment. In other words, the clutch according to the present invention may be a clutch without a clutch release mechanism as shown in FIG. 16.

Alternative Embodiment 4

Figure 17:
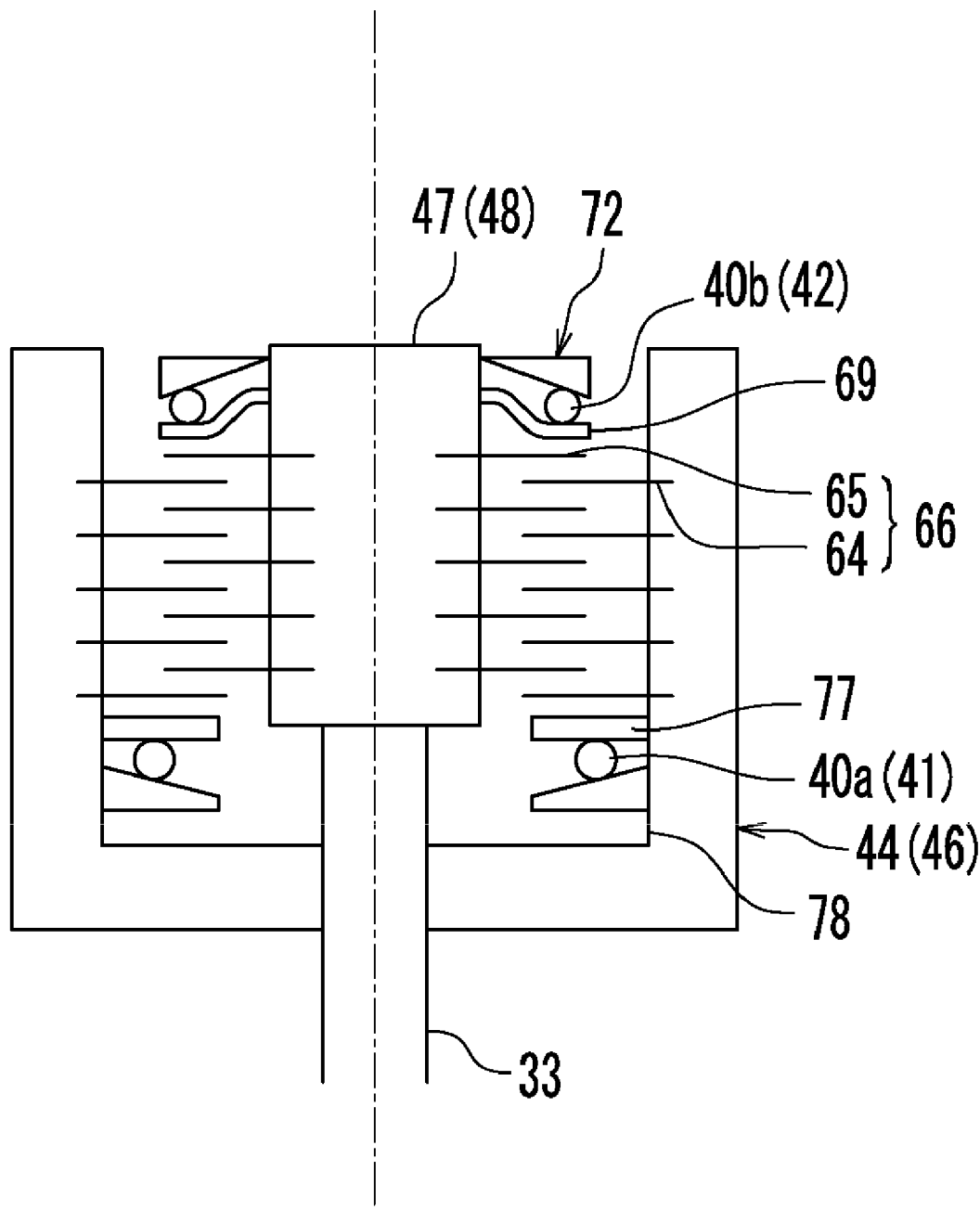
FIG. 17 is a schematic cross-sectional view of a centrifugal clutch according to an alternative embodiment 4.

In the above embodiment, the case where the pressure plate 77 and the roller retainer 69 are on the same side with respect to the group of plates 66 is described. In other words, the case where the two kinds of roller weight 41 and 42 are on the same side with respect to the group of plates 66 is described. However, the present invention is not limited to the configuration of the above embodiment. As shown in FIG. 17, in relation to the group of plates 66, the pressure plate 77 may be disposed on the opposite side of the roller retainer 69. In other words, the two kinds of roller weights 41 and 42 may be disposed on the opposite sides of the group of plates 66.

Thus, the locational interference between the input side roller weight 41 and the output side roller weight 42 can be prevented. Therefore, both the input side roller weight 41 and the output side roller weight 42 can be disposed in a position to be relatively apart from the axis line AX. Accordingly, relatively large centrifugal force acting on both roller weights 41 and 42 can be generated without increasing the thickness of the clutch 2 in the axial direction of axis line AX.

FIG. 17 is a schematic illustration showing the positional relation between the pressure plate 77, the roller retainer 69, two kinds of roller weights 41, 42, and the group of plates 66. In FIG. 17, the drawing of the specific embodiment of the clutch according to alternative embodiment 4 is omitted.

Other Alternative Embodiments

In the above embodiment, the motorcycle 1, a so-called motorcycle in a narrow sense shown in FIG. 1, is described as an example of a vehicle suitable for carrying out the present invention. However, the vehicle according to the present invention is not limited thereto. The vehicle according to the present invention may be a straddle-type vehicle, for example, such as an off-road type motorcycle, a scooter or a moped, or an ATV (All Terrain Vehicle). Also, the vehicle according to the present invention may be a vehicle other than a straddle-type vehicle, such as a 4-wheeled vehicle.

In the above embodiment, an exemplary vehicle with the engine 4 is described as a preferred embodiment in carrying out the present invention. However, a vehicle according to the present invention may be a vehicle without an engine. For example, a vehicle according to the present invention may include any kind of drive source. For example, the vehicle according to the present invention may include an electric motor or the like as a drive source.

Also, in the above embodiment, an example using a water cooled, 4-cycle, parallel, 4-cylinder type engine 4 is described, however, the type of engine is not specifically limited in the present invention.

In the present invention, the drive force transmission mechanism that transmits power from the power unit 3 to the rear wheel 19 is not limited to the chain 25, and the drive force transmission mechanism may be, for example, as a driveshaft or a belt.

In the above embodiment, an example where the clutch housing 46 constitutes the input side clutch member 44 and the clutch boss 48 constitutes the output side clutch member 47 is described. However, the present invention is not limited to this configuration. For example, it is possible that the clutch housing 46 constitutes the output side clutch member 47 and the clutch boss 48 constitutes the input side clutch member 44.

A rider sitting on the motorcycle 1 operates a clutch lever or a clutch pedal (not shown), and thereby a drive mechanism such as an oil pump may be operated. The force that is generated by the oil pump may be applied to the clutch release mechanism 86 to forcibly release the pressed-contact state of the group of plates 66.

While multiple embodiments have been described in connection with the figures hereinabove, the invention is not limited to these embodiments, but rather can be modified and adapted as appropriate. Thus, it is to be clearly understood that the above description was made only for purposes of an example and not as a limitation on the scope of the invention as claimed herein below.

What is claimed:
1. A clutch, comprising:
 a group of plates including:
  an input side clutch member rotatable around an axis,
  an output side clutch member coaxially rotatable around said axis, an input side clutch disc rotated with said input side clutch member, and an output side clutch disc facing said input side clutch disc and being displaceable in the direction of said axis while being rotated with said output side clutch member;

an input side pressure member coaxially arranged on one side of the group of plates, said input side pressure member being rotated with said input side clutch member and being displaceable in the direction of said axis, said input side pressure member pressing said group of plates directly or indirectly when displaced toward said group of plates in the direction of said axis and thereby bringing said group of plates into a pressed-contact state;

an input side retainer facing a surface of said input side pressure member that is disposed opposite said group of plates, said input side retainer and said input side pressure member forming together a first space that narrows with increased radial distance from said axis, said input side retainer being supported on said input side clutch member so as to be displaceable in the direction of the axis while being rotated with said input side clutch member, and said input side retainer being biased toward said group of plates by a first biasing member;

an input side press body disposed in said first space between said input side pressure member and said input side retainer and revolving around said axis with the rotation of said input side clutch member, said input side press body being configured to move radially away from said axis while pressing said input side pressure member toward said group of plates by centrifugal force generated during the rotation of said input side clutch member;

an output side pressure member coaxially rotated with said output side clutch member and being displaceable in the direction of said axis, said output side pressure member pressing said group of plates directly or indirectly when displaced toward said group of plates in the direction of said axis and thereby bringing said group of plates into a pressed-contact state;

an output side retainer facing a surface of said output side pressure member that is disposed opposite said group of plates, said output side retainer arranged to be coaxially rotated with the output side clutch member, said output side retainer and said output side pressure member forming together a second space that narrows with increased distance from said axis, said output side retainer being displaceable in the direction of said axis, and said output side retainer being biased toward said group of plates; and an output side press body disposed in said second space between said output side pressure member and said output side retainer and revolving around said axis with the rotation of said output side clutch member, said output side press body being configured to move radially away from said axis while pressing said output side pressure member toward said group of plates by centrifugal force generated during the rotation of said output side clutch member.

2. The clutch according to claim 1, wherein the rotational speed of said output side clutch member at which said output side press body starts moving in a centrifugal direction is lower than that of said input side clutch member at which said input side press body starts moving in a centrifugal direction.

3. The clutch according to claim 1 or 2, further comprising:
an input side biasing member disposed between said input side clutch member and said input side pressure member, said input side biasing member biasing said input side pressure member in a direction away from said group of plates; and an output side biasing member disposed between said output side clutch member and said output side pressure member, said output side biasing member biasing said output side pressure member in a direction away from said group of plates, wherein the biasing force of said output side biasing member is weaker than the biasing force of said input side biasing member.

4. The clutch according to claim 1, wherein said input side clutch member comprises a clutch housing and said output side clutch member comprises a clutch boss which is disposed in said clutch housing.

5. The clutch according to claim 1, further comprising a release mechanism which is configured to forcibly release said pressed-contact state of said group of plates in response to an externally applied force.

6. The clutch according to claim 1, wherein said input side pressure member and said output side pressure member press said group of plates to each other from the same direction.

7. The clutch according to claim 1, wherein said output side pressure member, said output side retainer and said output side press body are disposed on one side of said group of plates, and said input side pressure member, said input side retainer and said input side press body are disposed further from said group of plates on said one side than said output side pressure member, said output side retainer and said output side press body.

8. The clutch according to claim 1, wherein said input side pressure member and said output side pressure member press said group of plates to each other from the opposite direction in the direction of said axis.

9. The clutch according to claim 1, wherein said input side pressure member indirectly presses said group of plates through said output side retainer and said first biasing member biases said output side retainer toward said group of plates through said input side pressure member.

10. The clutch according to claim 1, wherein said input side press body is located further from said from said group of plates than said output side press body in the direction of said axis, and said input side press body is located further apart from said axis in a radial direction than said output side press body.

11. The clutch according to claim 3, further comprising a release mechanism which is configured to forcibly release said pressed-contact state of said group of plates in response to an externally applied force.

12. The clutch according to claim 11, wherein said input side pressure member and said output side pressure member press said group of plates to each other from the same direction.

13. The clutch according to claim 12, wherein said input side pressure member indirectly presses said group of plates through said output side retainer and said first biasing member biases said output side retainer toward said group of plates through said input side pressure member.

14. A vehicle comprising the clutch according to claim 1.

15. A centrifugal clutch, comprising:
a clutch housing rotatable around an axis line;
a clutch boss arranged inside the clutch housing and rotatable around the axis line;
a plate group having a friction plate rotated with the clutch housing and a clutch plate facing the friction plate and rotated with the clutch boss, the clutch plate being arranged on the clutch boss so as to be displaceable in the direction of the axis line toward the friction plate;

a first pressure member disposed on one side of the plate group and coaxial with the plate group, the first pressure member being displaceable in the direction of the axis line while being rotated with the clutch housing, the first pressure member being biased away from the plate group when the rotational speed of the clutch housing is less than a first predetermined threshold, and the first pressure member being displaced in the direction of the axis line to directly or indirectly press the plate group and put the plate group in a pressed-contact state when the rotational speed of the clutch housing exceeds the first threshold;

a retainer facing a surface on one side of the first pressure member opposite the plate group, the retainer supported by the clutch housing so as to be displaceable in the direction of the axis line while being rotated with the clutch housing, and the retainer forming a space with the first pressure member that narrows with increased radial distance from the axis line;

a plate spring provided between the clutch housing and the retainer on a side of the retainer opposite the first pressure member, the plate spring extending in a direction which is inclined relative to the direction of the axis line from a first end portion toward a second end portion in a centrifugal direction, and the first end portion being fixed directly or indirectly to the clutch housing while the second end portion directly or indirectly biases the retainer toward the first pressure member;

a pressing body arranged in the space formed between the first pressure member and the retainer, the pressing body being revolved around the axis line with the rotation of the clutch housing, and the pressing body being moved outwardly in the centrifugal direction while pressing the first pressure member toward the plate group by a centrifugal force generated by the rotation of the clutch housing when the rotational speed of the clutch housing exceeds the first threshold;

a clutch release mechanism configured to press the first pressure member axially away from the plate group and release the pressed-contact state of the plate group when actuated by an actuation member; and a second pressure member coaxial with the plate group and interposed between the plate group and the first pressure member, wherein:

the second pressure member is displaceable in the direction of the axis line while being rotated with the clutch boss;

the second pressure member is displaced by a biasing force in the direction of the axis line to press the plate group and put the plate group in a pressed-contact state, the biasing force being generated by the first pressure member, retainer, plate spring and pressing body when the rotational speed of the clutch housing exceeds the first threshold;

the second pressure member maintaining the pressed-contact state of the plate group, in the absence of the actuation of the clutch release mechanism, as long as the rotational speed of the clutch boss is greater than a second predetermined threshold;

the second pressure member is biased away from the plate group when the rotational speed of the clutch boss drops below the second predetermined threshold; and wherein the second predetermined threshold is less than the first predetermined threshold.

16. The centrifugal clutch according to claim 15, wherein the clutch release mechanism is also configured to press the second pressure member away from the plate group and release the pressed-contact state of the plate group when actuated by the actuation member.

17. A vehicle comprising the centrifugal clutch according to claim 15.

18. A clutch, comprising:
a rotatable main shaft having an axis;
a group of plates coaxially disposed on said main shaft, said group of plates including:
an input side clutch member rotatable around said axis and rotatable relative to said main shaft,
an output side clutch member rotatably fixed to said main shaft to coaxially rotate with said main shaft around said axis,
an input side clutch disc rotated with said input side clutch member, and
an output side clutch disc facing said input side clutch disc and being displaceable in the direction of said axis while being rotated with said output side clutch member;
an input side pressure member coaxially arranged on one side of the group of plates, said input side pressure member being supported by said input side clutch member to be displaceable in the direction of said axis while being rotated with said input side clutch member, said input side pressure member pressing said group of plates directly or indirectly when displaced toward said group of plates in the direction of said axis and thereby bringing said group of plates into a pressed-contact state;
an input side retainer facing a surface of said input side pressure member that is disposed opposite said group of plates, said input side retainer and said input side pressure member forming together a first space that narrows with increased radial distance from said axis, said input side retainer being supported on said input side clutch member so as to be displaceable in the direction of the axis while being rotated with said input side clutch member, and said input side retainer being biased toward said group of plates by a first biasing member;
an input side press body disposed in said first space between said input side pressure member and said input side retainer and revolving around said axis with the rotation of said input side clutch member, said input side press body being configured to move radially away from said axis while pressing said input side pressure member toward said group of plates by centrifugal force generated during the rotation of said input side clutch member;
a rotatable side shaft coaxially arranged with said main shaft to rotate with said main shaft, said side shaft being displaceable in the direction of said axis relative to said main shaft and said group of plates;
an output side pressure member rotatably fixed to said side shaft and said output side clutch member so as to coaxially rotate with said side shaft and said output side clutch member while being displaceable in the direction of said axis relative to said side shaft and said group of plates, said output side pressure member pressing said group of plates directly or indirectly when displaced toward said group of plates in the direction of said axis and thereby bringing said group of plates into a pressed-contact state;
an output side retainer facing a surface of said output side pressure member that is disposed opposite said group of plates, said output side retainer arranged to be coaxially rotated with the output side clutch member, said output side retainer and said output side pressure member forming together a second space that narrows with increased distance from said axis, said output side retainer being fixed to said side shaft so as to coaxially rotate with said side shaft and to be displaceable with said side shaft in the direction of said axis, and said output side retainer and said side shaft being biased toward said group of plates; and an output side press body disposed in said second space between said output side pressure member and said output side retainer and revolving around said axis with the rotation of said output side clutch member, said output side press body being configured to move radially away from said axis while pressing said output side pressure member toward said group of plates by centrifugal force generated during the rotation of said output side clutch member.

* * * * *